United States Patent [19]
Farley

[11] Patent Number: 5,767,659
[45] Date of Patent: Jun. 16, 1998

[54] BATTERIES AND BATTERY SYSTEMS

[75] Inventor: Joseph D. Farley, Villeneuve Loubet, France

[73] Assignee: Texas Instruments Incorporated, Dallas, Tex.

[21] Appl. No.: 802,088

[22] Filed: Feb. 18, 1997

Related U.S. Application Data

[63] Continuation of Ser. No. 308,467, Sep. 19, 1994, abandoned, which is a continuation of Ser. No. 969,694, Oct. 30, 1992, abandoned.

[30] Foreign Application Priority Data

Oct. 30, 1991 [FR] France ............... 91402919.4

[51] Int. Cl.$^6$ ............... H02J 7/04
[52] U.S. Cl. ............... 320/106; 320/150
[58] Field of Search ............... 320/106, 118, 320/132, 134, 136, 144, 150, 155, 153, DIG. 21, 128, 113, 130, 138, 147

[56] References Cited

U.S. PATENT DOCUMENTS

| | | | |
|---|---|---|---|
| 4,223,232 | 9/1980 | Bulat ............... | 307/66 |
| 4,455,523 | 6/1984 | Koenck . | |
| 4,649,333 | 3/1987 | Moore ............... | 320/35 |
| 4,845,419 | 7/1989 | Hacker ............... | 320/39 |
| 4,965,738 | 10/1990 | Bauer et al. ............... | 320/39 |
| 5,168,206 | 12/1992 | Jones ............... | 320/14 X |
| 5,200,689 | 4/1993 | Interiano et al. ............... | 320/31 |

FOREIGN PATENT DOCUMENTS

| | | |
|---|---|---|
| A-0 290 396 | 11/1988 | European Pat. Off. . |
| A-3 832 840 | 3/1990 | Germany . |
| WO-A-8 802 565 | 4/1988 | WIPO . |
| WO-A-9 002 432 | 3/1990 | WIPO . |
| WO-A-9 003 682 | 4/1990 | WIPO . |

*Primary Examiner*—Edward Tso
*Attorney, Agent, or Firm*—Gerald E. Laws; William B. Kempler; Richard L. Donaldson

[57] ABSTRACT

Battery pack which includes rechargeable battery cells in conjunction with a charge protection circuit to prevent damage to the battery pack. The battery pack further includes a component in which predetermined battery parameters definitive of a battery pack characteristic may be stored, together with a battery parameter sensor, and a micro-controller responsive to the sensing of a battery parameter for controlling the battery pack characteristic based upon the sensed parameter. In one aspect, the sensed parameter may be the onset of substantially full charge as provided by a current source operably connected to the battery pack and subject to being disconnected when a predetermined cell temperature is reached which is indicative of full charge.

5 Claims, 21 Drawing Sheets

TO FIG. 10B

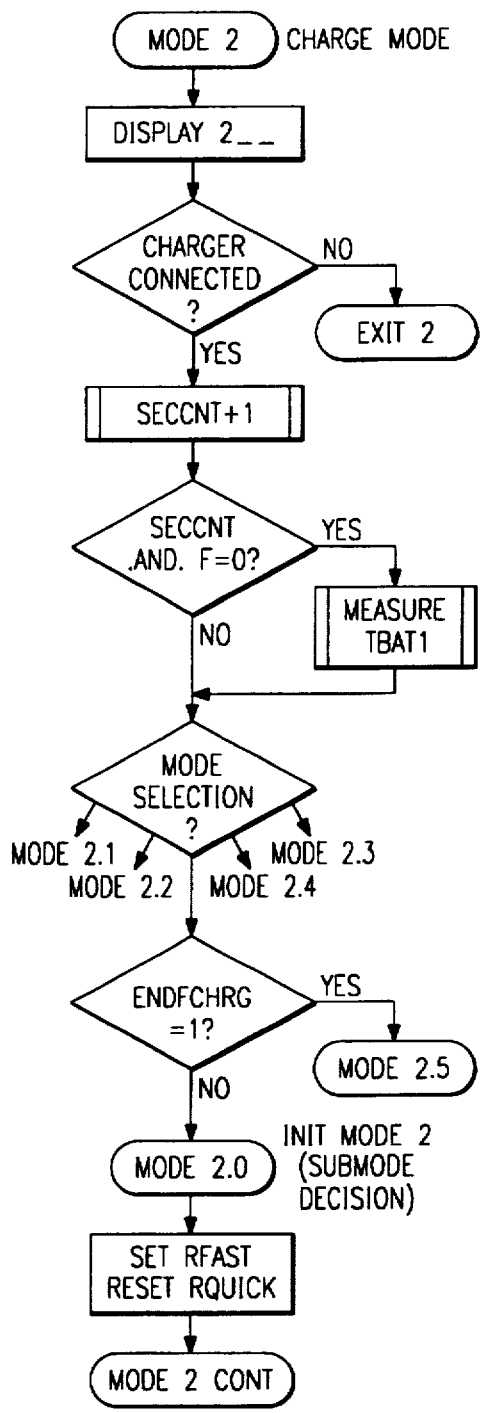
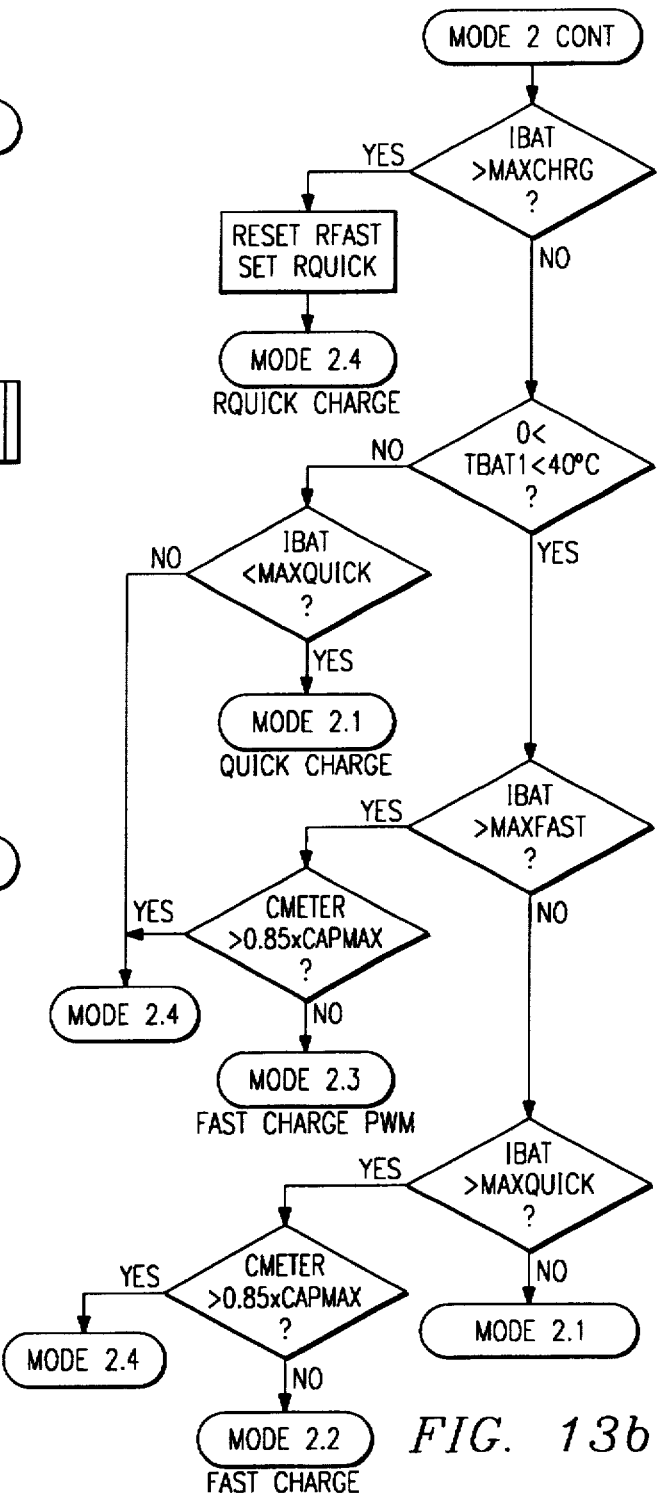
FIG. 13a
FIG. 13b

BATTERIES AND BATTERY SYSTEMS

This application is a Continuation of application Ser. No. 08/308,467, filed Sep. 19, 1994 abandoned which is a continuation of Ser. No. 07/969,694, filed Oct. 30, 1992, now abandoned entitled BATTERIES AND BATTERY SYSTEMS.

The present invention relates to batteries and in particular to rechargeable batteries and the recharging thereof, for example Nickel Cadmium batteries, Metal Hydride batteries and other battery types. The invention also relates to battery packs including such batteries and protection circuits for batteries. The invention yet further relates to systems including batteries whether rechargeable or not including sytems providing an indication or control of battery condition or state.

When Nickel Cadmium batteries, for example, are charged, pressure within the battery casing increases, being particularly severe when the battery reaches full charge. If the battery is charged with a low or trickle current, then the battery is designed to withstand the increased pressure due to charging. In the case of a fast charge however, where a high current is necessarily employed, there is a significant risk of battery explosion if the battery were to reach full charge and the fast charging current maintained. For this reason, fast chargers typically are arranged to reduce the charging current to at least a safe trickle level upon detection of the battery temperature rise associated with full charge. More sophisticated chargers might detect the fall in cell voltage associated with full charge to trigger a reduction in charging current to a safe level, this latter technique known in the art as negative delta voltage ($-\Delta v$) control.

Hence, it may be appreciated that a charger of both suitable type and rating for the battery being charged must be employed. There would, for example, be a significant risk in charging a battery of the Nickel Hydride type with a charger intended for Nickel Cadmium type and the attendant risk of the use, by the public for example, of such chargers with Metal Hydride batteries has adversely affected the commercial introduction of this latter type of battery. It is anticipated that this risk may increase as new battery technologies are developed.

Such risk would be particularly great if a Metal Hydride battery for example were manufactured with the standard mating footprint of a common piece of apparatus such as a video camera for which Nickel-Cadmium types (and hence chargers) had already been supplied.

Overcharge protected battery chargers for Nickel-Cadmium cells are an example of a control system for battery based operations. Other protection regimes might be employed for different battery types. Also known are arrangements which provide an indication of the present state of a battery, for example by performing a simple voltage measurement.

In this context battery systems may be identified, such systems including, for example a battery connected to a load, a battery connected to a charger, a battery connected to a battery condition monitor and a battery connected to a simple overcharge protection arrangement forming part of a battery charger such as a circuit for reducing charging current with voltage (for use with a lead-acid battery for example) or a battery temperature sensing bimetallic strip in the charging path to disconnect charging current once a certain temperature is reached (for use with Nickel-Cadmium battery for example). Aspects of the present invention have been arrived at by a consideration of batteries from this systems stand point.

According to the present invention in a first aspect thereof, there is provided apparatus for association with a battery in a battery system, said apparatus being arranged to sense a battery operating parameter and provide an adaption in said battery system in response to a change in a battery characteristic as a result of said battery operation.

One operating parameter that might be sensed is onset of substantially full charge and one adaption that might be made is charge current shunting following said onset.

Parameters may be sensed which allow a calculation of the charge level currently remaining in a battery or battery pack and an adaption made in a value indicative of such remaining charge. The value may be displayed, on an indicator on a battery pack, for example, or transmitted for example to host apparatus for display or other action, such as warning or battery economy functionality.

In order that features and advantages of the present invention may be further appreciated embodiments will now be described with reference to the accompanying diagrammatic drawings of which:

Figure 8A:
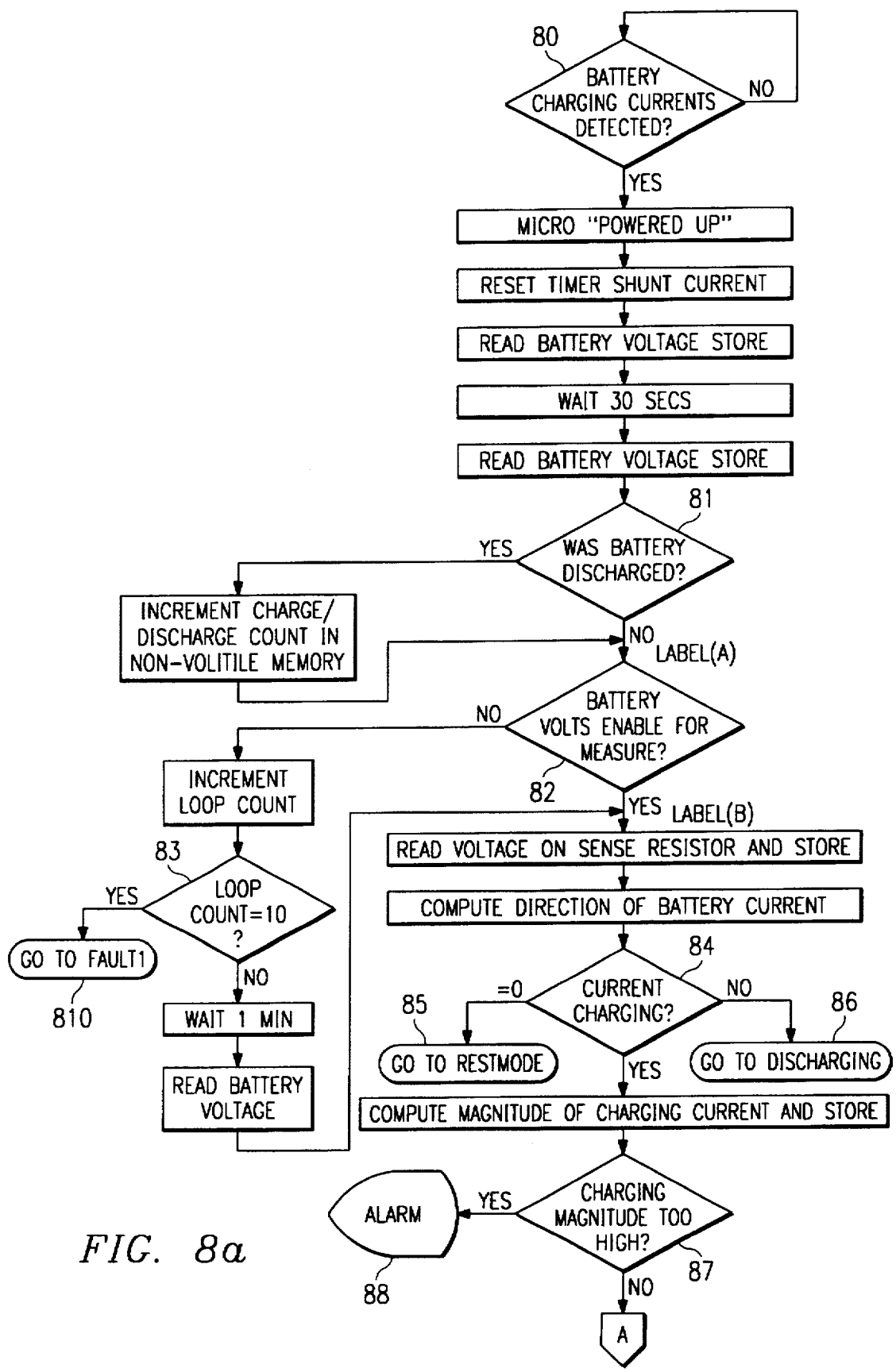
Figure 8B:
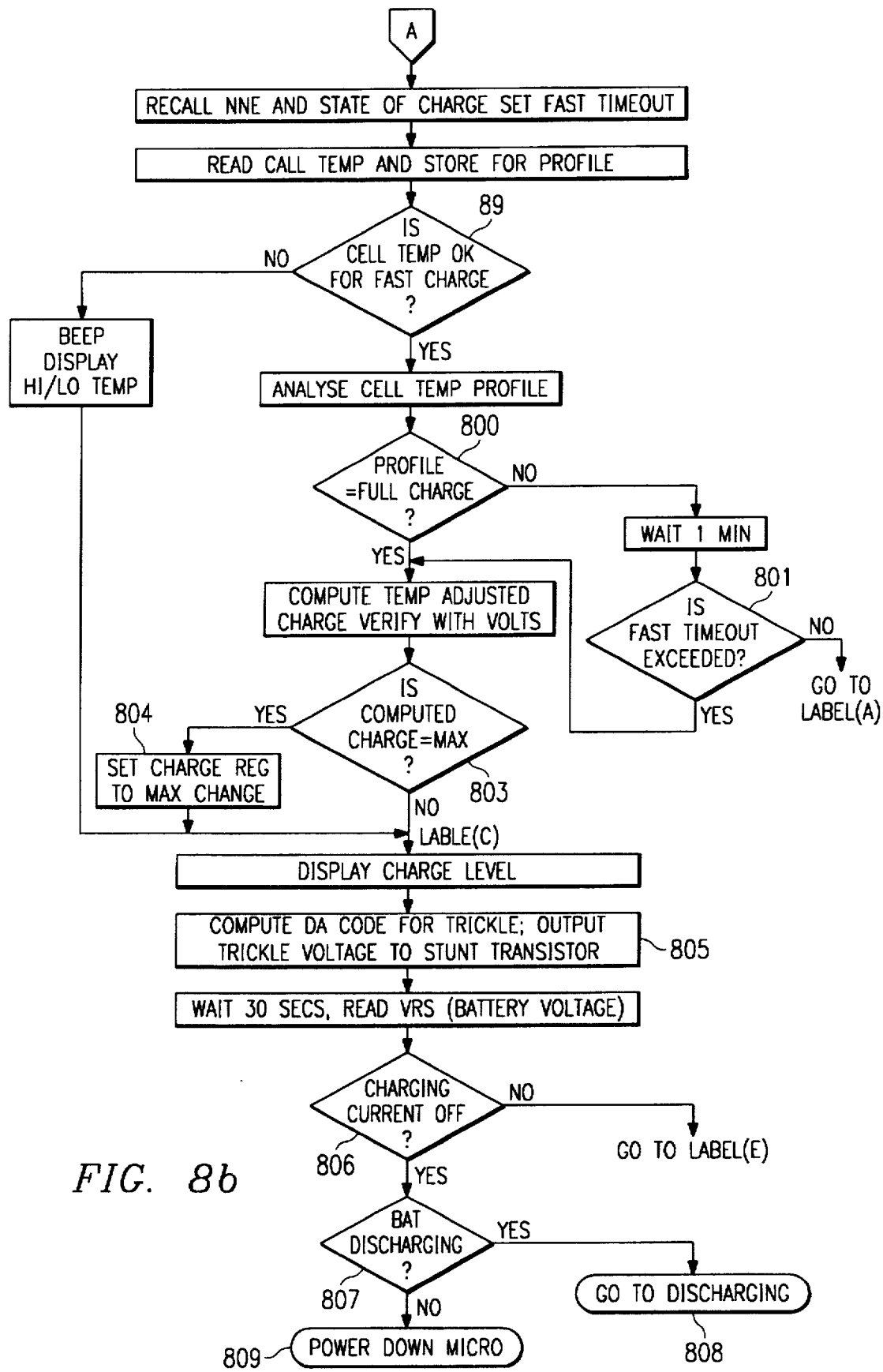
Figure 9:
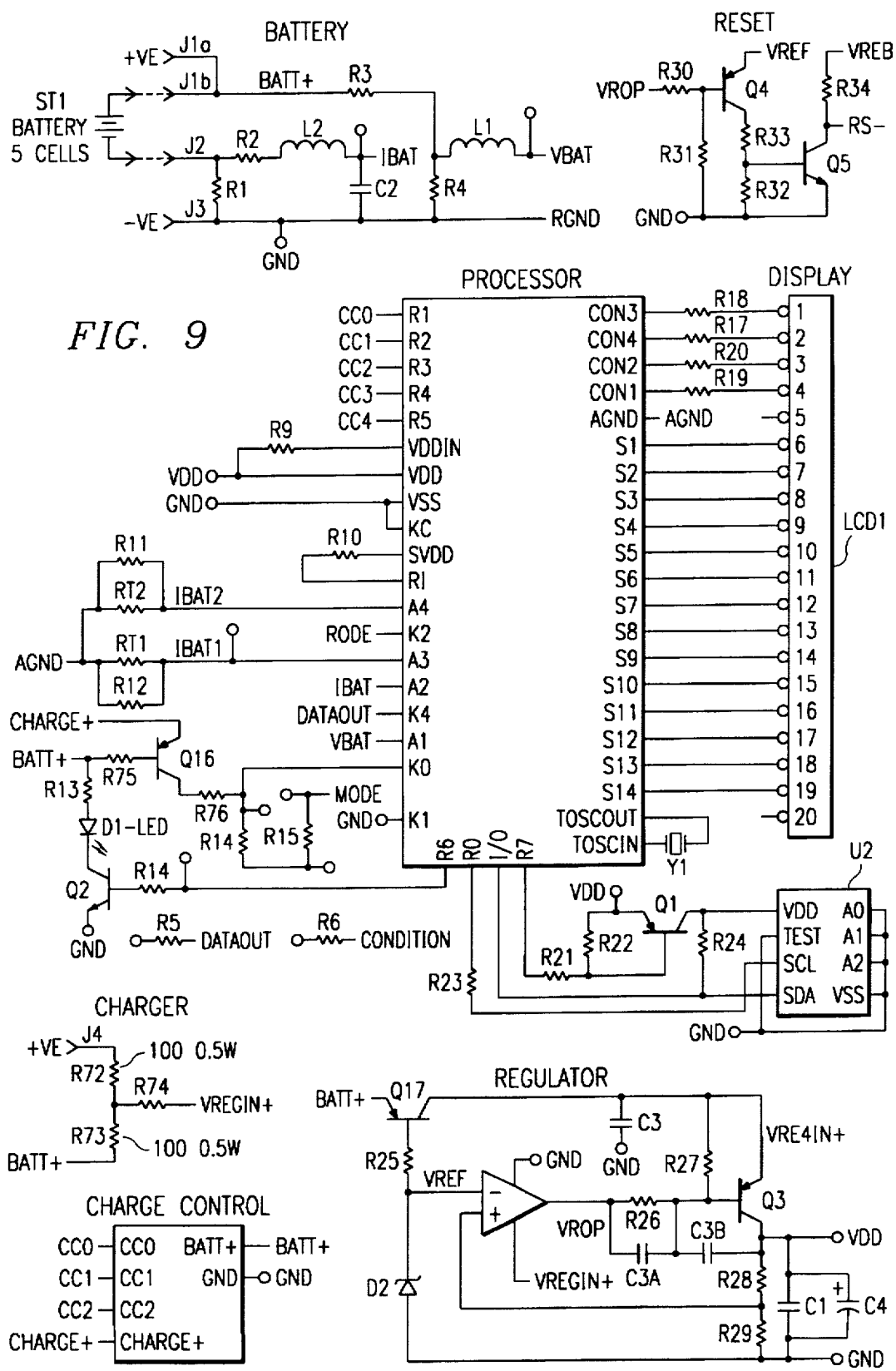
Figure 15:
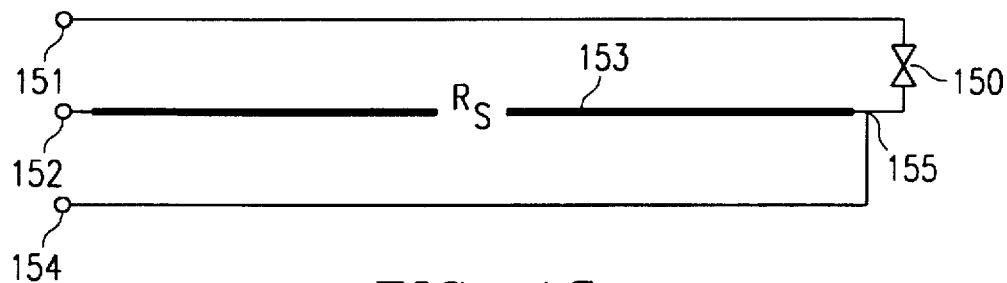

FIG. 8(a) and FIG. 8(b) is a flow chart of typical operation,

FIG. 9 represents a circuit schematic,

FIGS. 10 to 14(c) are further flow charts of operation,

FIG. 15 shows a current sensing element, and

Figure 16:
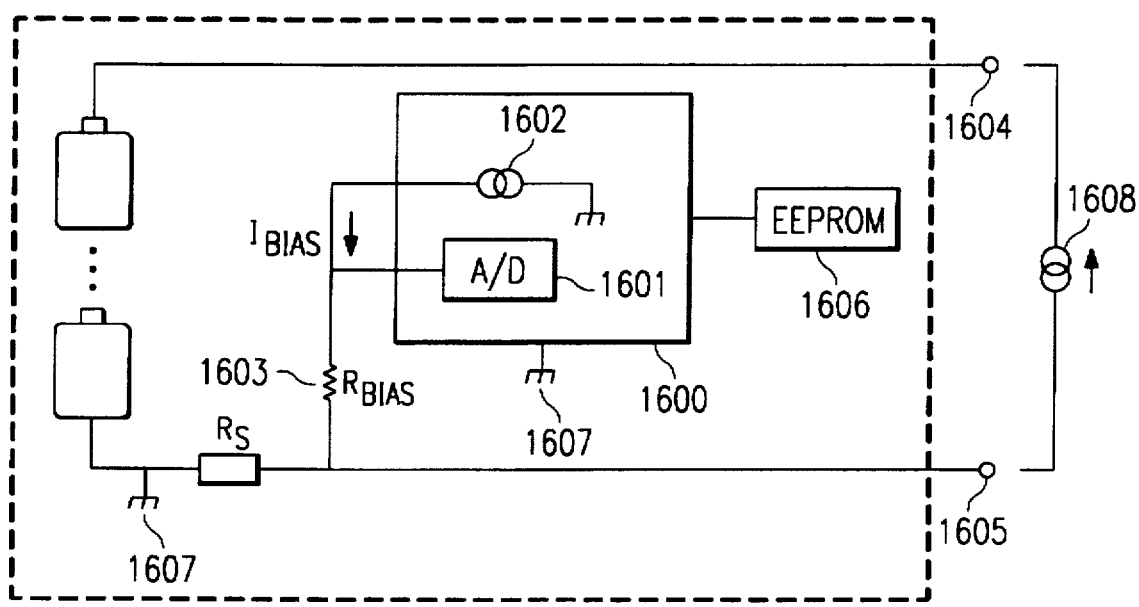

FIG. 16 shows an arrangement for calibration.

Figure 1:
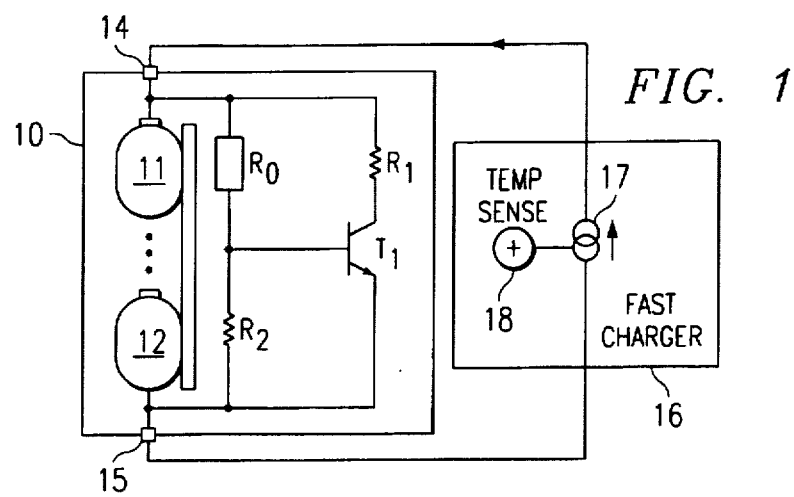
FIG. 1 represents a battery, charger and protection circuit.

FIG. 1 shows a battery pack providing overcharge protection. The battery pack contains for example, two Nickel-Cadmium cells 11, 12 wired in series and connected to a positive battery pack terminal 14 and a negative terminal 15 within a housing 10. With Nickel-Cadmium cells and in particular the newer battery technologies of Metal Hydride or Lithium based batteries, etc. a problem arises in providing a fast recharge high current charging regime without reducing cell life time (i.e. number of charge discharge cycles before damage). Full charge detection and immediate stopping of fast charge current is imperative for preservation of battery longevity and indeed safety in some cases. At full charge, heat is generated within the cell resulting in an increase in temperature and a change in cell voltage (NiCad–ve $\Delta v$ phenomena).

It is therefore proposed in accordance with the present invention to include within the battery pack a negative temperature coefficient resistor $R_\theta$, co-operating with a further resistor $R_2$, power absorbing resistor $R_1$, and a power switching transistor $T_1$. $R_\theta$ is arranged to be in thermal contact with the cells. The battery pack is connected to a battery charger 16 shown diagrammatically to include a current source 17. The charger 16 is of the type suitable for use with Nickel Cadmium cells in a fast charging regime. That is the constant current source 16 delivers a relatively high current and a temperature sensor 18 is provided to contact the cell being charged and disconnects the current source when a pre-determined cell temperature is reached (indicative of full charge).

$R_\theta$ and $R_2$ are defined such that at a preselected temperature $T_1$ begins to conduct. The high charging current (fast charge current) is then diverted from the cells into $T_1$. i.e. shunted from the cells. Heat now generated in $R_1$ increases the temperature of the battery pack by virtue of its thermal coupling permitting the temperature or delta temperature function of the external charger's end of charge fast current arrest to function by virtue of contact of sensor 18 with housing 10. Typically, up to 2–3 watts could be radiated from $R_1$, for example, resulting in an acceptable (in terms of battery life) battery operating temperature. It will be necessary to have an appropriate thermal resistance between $R_1$ and $R_\theta$ enforced by physical layout for example. In some cases the entire charging current could be shunted, allowing safe fast charging even with a charger that was not itself equipped with full charge detection.

It will be appreciated that safe operation is not a function of cell type and that Metal-Hydride, for example, cells could be used with the Nickel-Cadmium configured charger. Enabling one cell type to mimic another permits interchange of charger types and, as in the example above, the safe use of existing chargers.

Figure 2:
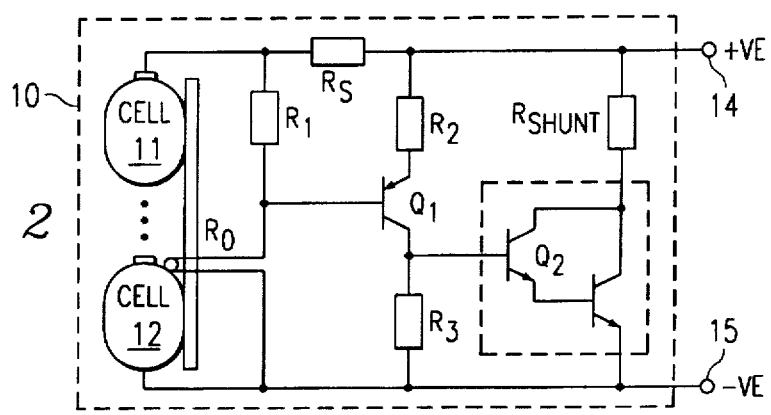
FIG. 2 is a partial circuit schematic of a second embodiment of the battery pack having an overcharge protection circuit.

An alternative embodiment is illustrated in FIG. 2 where parts are the same or equivalent to those of FIG. 1 common reference numerals have been used. The presence of a sensing resistor $R_s$ in the cell supply line will be noted, as will the extra switching transistor $Q_1$. The main shunting transistor $Q_2$ has been uprated, with respect to that of FIG. 1, to a darlington configuration.

Consider that the arrangement is connected to an operative charger, i.e. that there is current flow into the cells. Eventually, the temperature rise due to charging sensed by $R_\theta$ causes both $Q_1$ and $Q_2$ to turn hand-on. $Q_2$ provides shunting as previously described. As the cells cools and the resistance of $R_\theta$ increases, $Q_1$ may turn off allowing the charging regime to be reestablished. Hence with this arrangement, charge control may be established as a function of the battery pack allowing a broad range of charger types to be used virtually any current source being suitable.

In design, values of R and $R_\theta$ (negative temperature coefficient) are chosen to give a dc bias ensuring that the transistors are hard on at the predetermined cell temperature. As to switching, gain is exhibited as follows:

Let an increment in charging current be:

$$\Delta I_{charge} = \frac{\Delta V_{Rs}}{R_s}$$

Where $V_{Rs}$ is the voltage across $R_s$.
The resulting change in shunted current will be:

$$\Delta I_{shunt} = \frac{\Delta V_{Rs}}{R_2} * h_{FE}Q_2$$

Giving gain:

$$= \frac{\Delta I_{shunt}}{\Delta I_{charge}} = \frac{R_s}{R_2} * h_{FE}Q_2$$

Consider now that the battery pack is connected to a load, i.e. there is a net current flow from the cells. The voltage across $R_s$ now holds $Q_1$ off to ensure that no current is shunted.

The ability to adapt to the direction of current flow is a particularly attractive feature, and an arrangement for amongst other things further exploiting this concept will now be considered. An embodiment is shown in FIG. 3 and as previously, common reference numerals have been used where appropriate.

A sense resistor $R_s$ is present in negative cell supply line 30. This sensor is used to provide a differential input to a signal conditioning circuit 31 and onward to a multiplexer 32. A temperature sensor 33 which is in intimate contact with a heat conductive member 34 contacting the cells also provides a signal to multiplexer 32. A yet further input to the multiplexer 32 is provided on an input line 35 connected to the overall positive voltage line of the cell array. One of the signals present at the inputs of multiplexer 32 may be selected thereby for application to an analog to digital converter 36 which operates in association with a reference voltage 37. The output of the A to D convertor 36 is fed as data to a CPU 38 of a microprocessor arrangement including read only memory 39 and random access memory 300. The processor 38 controls a programmed logic array 301 which in turn activates a display 302 and also controls a power driver arrangement 303 which can switch a power transistor 304 and activate a sounding device 305. Power transistor 304 is connected in association with resistive elements 306 and 307 to provide charge current shunting in a way similar to that already described in relation to the previous embodiment. Resistor 307 is a power resistor which has an associated heat sink 308. Associated with the processor 38 is a timer 309. In the drawing figure, operational signal paths and components inconnections have been shown; signal connections such as data buses, address buses, control and timing signal connections have been omitted for clarity.

In the arrangement as described above, it will be noted that the signal derived from sensor $R_s$ is not used directly as a circuit component, but rather as a means of providing a signal to a processing arrangement whereby adaptation of the battery system may be controlled.

Figure 3:
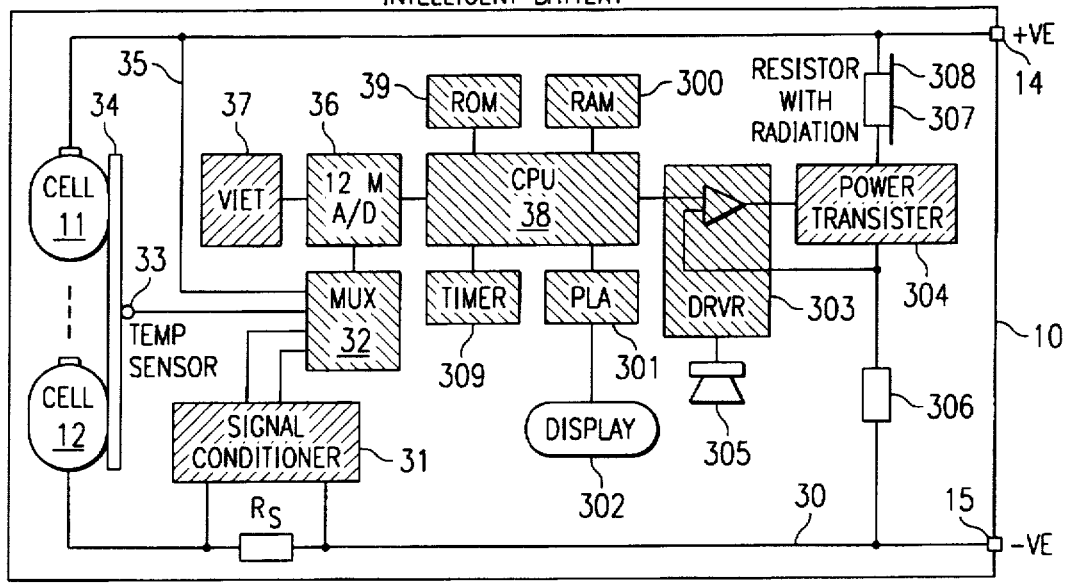
FIG. 3 and FIG. 4 represent battery pack arrangements in schematic form.

The arrangement of FIG. 3 may be arranged to provide overcharge protection and charge metering.

The voltage across $R_s$ represents a sense resistor determination of battery current magnitude and direction. Use of a Hall effect device is an alternative to the use of this resistor keeping the load on the battery the same and its impedance unchanged. The processor is a sensor type microprocessor (micro-controller) with ROM and RAM and perhaps EPROM for non volatile storage inputs permitting the periodic measuring of cell temperature, and battery pack current amplitude and direction. A suitable type would be TSS400 (Texas Instruments).

The operation of the embodiment will now be considered.

The signal that commands transistor 304 to be on is used to give the battery full charge reference by means for example of detection of temperature profile or $-\Delta v$ tracked by the controller. Battery capacity will now be known for the current condition of the cells, since two reference points (full charge and no charge) are fixed and current into and out of the cells can be measured and tracked by the controller and Rs.. The full charge reference can be updated each time a full charge detection is made and thus battery capacity with ageing can be tracked by storing in EAROM; even if the cells are charged to some intermediate level in the interim, actual battery capacity will still be known based on the monitoring of current into and out of the cells. When the battery voltage goes below say 1 Volt per cell (predetermined per type of cell), the cells are considered to be completely discharged giving the zero charge reference. These references may be updated in nonvolatile rewritable memory and thus permits present total battery capacity to be computed, relative to the established zero and full charge references.

In the processor's memory preprogrammed battery information is loaded. Type, date, present capacity, etc can be flashed in the display 302 for say 5 seconds at the start of each charge cycle. This information can be updated as charging proceeds to be displayed periodically or on demand.

The display 302 may be of the liquid crystal type and may also be used to display other messages of interest to the user, such as "Battery Charging in Progress". The display may be programmed to display the computed metered charge level relative to a cell of full capacity and/or relative to the computed actual capacity established during the last charge cycle of the battery pack. When sourcing current, the time to complete discharge at the present loading may be displayed as 'minutes remaining' for example. Likewise during charging, 'minutes to full charge' could be displayed. The audible warning device may be used for example to warn of the onset of a low charge condition or the end of a charge cycle.

In the program executed by the processor 38, account can be taken of the cell discharge current, and the magnitude of the discharge current with temperature in order to improve the accuracy of the stored battery charge state information. To arrive at the present charge state, the historical current flow through the sensing resistor may be integrated and assessed in relation to the stored battery parameters. Hence, a charge meter may be provided which always tracks the condition or state of the battery pack cells, whether they are being charged, loaded, or are inactive. When no current flow through $R_s$ is detected, the processor arrangement may be placed in a low current standby mode to save power, this mode may also be arranged positively to ensure that the shunt switching transistor is off. In other operating regimes, current either taken or provided to the cells in either direction may be monitored by virtue of $R_s$. Some capacitive charge storage is advantageously provided to allow the processor arrangement to operate for some limited time after the battery becomes completely discharged, to ensure, for example, that data to be stored in the non-volatile portions of the associated memory is secured.

It will be appreciated that the arrangement has the ability to protect cells from overcharge by virtue of the processor monitoring of cell temperature with time. For example, temperature measurements could be logged at intervals such as each 5–10 seconds, and when a profile which matches a stored profile indicative of substantially full charge is identified, the transistor may be switched to shunt the charging current. The battery pack temperature then rises due to the heat dissipated in resistor R enabling the simple full charge detection by temperature of the battery charger to operate to end the fast charge current in appropriate charger types. The processor may be arranged such that this overcharge protection occurs only when the temperature rise is due to the charging current (i.e. flow into the cells). It will be realised however that even for chargers without the latter capability, over charge protection is still provided due to the current shunting. This means that a very cheap charger circuit may be used, and further that protection is offered even in the event of an unsuitable charger being connected. Also, a battery pack may be safely left connected to its load even with a fast charger connected, since excess current will be shunted. Additionally or alternatively, protection could be effected by control of a relay in series with the charging current path.

The protection and metering circuit of FIG. 3 may be integrated; the lightly shaded elements may be integrated as a micro-controller alternatively, all shaded elements could be integrated. The invention provides the possibility of a single-chip arrangement, with external high current switch. This enables cost reduction as well as tight packaging requirements to be met.

An embodiment of an exemplary micro-controller based system will now be considered in more detail.

The system may include a 'sensor' type micro-controller (e.g. one of the TSS 400 series supplied by Texas Instruments Inc), a battery cell temperature sensor, a high current shunting transistor, a distributed heat radiating resistor, a current sense resistor and a display and audio beeper, all resident within the battery pack.

For the battery technology of the cells (Nickel Cadmium, Nickel Hydride, etc.) the characteristic temperature profile for the battery type reaching full charge is stored in the non-volatile ROM of the micro-controller. On a periodic basis, the current flowing through the current sensing resistor (0.025 Ohms in series with the battery output terminal will not greatly swamp the cells internal impedance) is monitored and the direction and amplitude of the current ascertained as is the present cell temperature in real time.

On detection of a temperature rise of the form that indicates substantially full charge for the battery type, the micro-controller checks with its stored data as to whether the magnitude of the charging current is below the threshold demanding full charge supervision or control; if so, no shunting of the charge current will be required on reaching full charge. However, if the charge current is great enough to require full charge supervision, the magnitude of the charge current shunted is computed to result in a net C/10 (or of magnitude recommended by the battery manufacturer) current into the cells where C is the specified full fast charge current. (Large capacity batteries for example can be equipped with additional terminals permitting a failsafe charger control protocol (data exchange) to exist between the battery and the charging circuit enabling direct control over the charging current.

During the 'shunting' period, the current into the cells continues to be monitored by the micro-controller and its magnitude compared to that permitted after full charge detect; if greater that C/10 plus the maximum possible shunt current, an alarm (beeps and flashing display) signals the user to halt the charging process (this indicating that a charger other than the recommended rating is used as the shunting capacity is exceeded).

Also during the shunting period, heat is produced by the shunting elements thus mimicking the operation of a Ni—Cad cell whatever the cell type; a charger with temperature sensing will detect this temp rise and stop delivery of the fast charge current. Also, on shunting say 1C from the battery, a voltage drop across the battery terminals will result; this will be deteced as a $-\Delta V$ thus again mimicking Ni—Cad characteristics enabling chargers controlled in this way to trigger. Battery packs thus controlled are therefore autonomous as regards their charge control; dangerous cell temperatures resulting in the full shunt current and alerting signals.

Through the monitoring of the charge and discharge currents the micro-controller computes the charge state of the battery, makes corrects for cell temperature and magnitude of current from the cells and may then display the results. Optional warning tones based on say, preset charge levels, e.g. low charge and full charge warning beeps, are also controlled by the micro-controller. The shunting circuit, under control of the micro-controller, is also programmed to 'auto-condition' the battery; i.e. perform a complete discharge followed by a full charge. This feature may be also or exclusively user initiated. Otherwise, the controller may be programmed to indicate the need for or to execute auto-conditioning periodically.

Some analysis and desirable operating procedures to be followed by the micro-computer as programmed will now be presented, three battery operating regimes being identified.

Rest-Mode

Here the battery niether has a load across its terminals nor receives a charging current into its terminals. Ni-cads in this state slowly self discharge with a current equivalent to Isd that is a function of the cells temperature. The charge at rest mode, $Q_r$, relative to the initial charge, $Q_{ir}$, is therefore:

$$Q_r = Q_{ir} - \Sigma\{Isd(T)\}\delta t,$$

summed over time in rest mode.

Discharging

Here there is a net current, $I_{dd}$, out of the battery cells.

Under discharge there must be a battery voltage within the normal operating range; this absolute voltage is a function of the cell temperature. If the actual value is below this lower threshold voltage, the battery can be considered fully discharged and the battery status so displayed. This can also be used to fix the lower reference point.

For discharge in the normal temperature compensated operating voltage range (i.e. with specified operating conditions), the remaining charge in the battery $Q_d$ is a function of the magnitude $I_{md}$ of current taken from the battery and the cell temperature.

$$Q_d = Q_r - \Sigma\{I_{dd}(I_{md}, T) + I_{sd}(T)\}\delta t;$$

summed over the total discharge time.

For large discharge currents the self discharge current will be proportionaley insignificant hence can be ignored.

Charging

Here there is a net current, $I_{cc}$, into the battery cells.

On charging completely discharged cells, there will be a wait time before the battery voltage falls within its normal operating range. The micro-controller must therefore wait for this to occur in defining zero charge state. The normal operational absolute voltage is a function of the cell temperature.

For charge in the cells normal temperature compensated operating range, the remaining charge in the battery, Qc is a function of the magnitude Imc of current charging the cells and their temperature.

$$Q_c = Q_r + \Sigma\{I_{cc}(I_{mc}, T) - I_{sd}(T)\}\delta t$$

summed over charge time.

Micro-Controller functionality in the three modes identified before will now be considered.

Mode-1 Battery not used—Rest Mode

In this mode, a Self Discharge Summation Register (SDR) is defined to give a value representing the time and temperature corrected value of charge lost by the battery through self discharge. In this regime:

1. The microprocessor is in its power down mode with the clock functions operating.

2. The cell temperature is measured periodically, say each 30 seconds and the Mode-1 self discharge normalised temperature calculated and added to the self discharge sum register SDR.

3. The voltage across Rs (Battery current sense resistor) is periodically (only every 10 seconds, since the processor needs to be fully powered) monitored and if less than say 20 mA (which is considered to represent zero current) the microprocessor returns to the powerdown mode.

A typical model for remaining capacity Cr, when battery is at rest is given by:

Cr=Ca*exp(-t/T), where:

Ca=actual or initial capacity

T=time constant in days (to 36.8% Ca)

t=open circuit rest time in days

This formula or a table representative thereof may be programmed in the processor to provide an indication of battery charge state.

Mode-2 Battery Discharging, i.e. net output current

In this mode, a Battery Discharging register is used to give a value representing the temperature corrected charge lost through self discharge, plus, the time, temperature and amplitude (vs time) corrected value of charge drawn from the battery (calculated from the voltage drop across $R_s$). In this regime:

1. The microprocessor powers up to full activity when the voltage amplitude measured across $R_s$ exceeds say 400 µV.

2. The cell temperature is measured periodically, say each 5 seconds and the Mode-1 self discharge normalised temperature calculated and added to the self discharge sum register SDR.

3. The voltage across $R_s$ (Battery current sense resistor) is periodically (once a second) monitored and if greater than say 400 µV the microprocessor remains in the powerup state and continues to monitor the charge from the battery and temperature and amplitude correcting the Battery Discharge Register with the calculated current value of remaining charge. The display is then updated with this value to indicate the battery's remaining charge.

4. Even at the end of Mode 2 operation, full (i.e. each second) monitoring is performed for about 2 hours to avoid errors in measurements due to short or sporadic usage.

Mode-3 Battery Charging, i.e. net input current

In this mode, a Battery Charging register is made to give a value representing the temperature corrected charge lost through self discharge, plus, the time, temperature and amplitude (vs time) corrected value of charge put into the battery (calculated from the voltage drop across Rs). On detection of a charging current, the battery characteristics pre-programmed in the memory of the microprocessor is displayed for a given time; an alternative would be to have the display activated when an optional battery condition button is pressed, or both may be combined.

When a preset determined temperature profile over time is detected through the temperature sensing or the −Δv point encountered or either, the battery is considered to be at a percentage of full charge depending upon cell type and the charge current shunting transistor switched on with a computed magnitude of shunt current to provide top-up to full charge. This may be actioned via a look up table. For example, Nickel-Cadmium cells typically give an indication when about 90% charged. Current may then be dropped to trickle level. With Metal Hydride types computed trickle current could be applied for a computed time fully to charge the cell. After full charge, trickle current for this type is reduced to zero by shunting to prevent cell damage.

When outside of the range of preprogrammed cell temperatures the shunting current is commanded such as to result in a net trickle current (appropriate to the cell type) into the cells. This helps prevent damage or unexpected behaviour when outside normal operating limits. In this regime:

1. The microprocessor powers up to full activity when the voltage amplitude measured across $R_s$ exceeds, say 400 µV. It can remain powered as long as the net current charges the cells as it will be supplied from the external source.

2. The cell temperature is measured periodically, say each 5 seconds and the Mode-1 self discharge normalised for temperature calculated and added to the self discharge sum register SDR.

3. The voltage across $R_s$ (Battery current sense resistor) is periodically (once a second) monitored and if greater than say 400 μV the microprocessor remains in the powerup state and continues to monitor the charge from the battery and temperature and amplitude correcting the Battery Discharge Register with the most recently calculated value of remaining charge. The display is then updated with this the battery's remaining charge.

4. During shunting, $R_s$ is continually monitored to take account of the current flow out/into the battery and the Battery Charge Register updated accordingly. Full charge will be indicated based on calculated average charge into battery after temperature profile has been detected.

It will be appreciated from the foregoing that the monitoring regimes and periodicity have been selected to conserve battery energy and in dependence upon the extent to which the processor must be powered to perform the required functions.

It will further be appreciated that at any time the battery charge state may be derived by combining the contents of the Self Discharge Register (SDR), the Battery Discharge Register (BDR), and the Battery Charging Register (BCR).

As an alternative of an addition to temperature and current sensing, an input transducer from the electrolyte itself may be used to signal charging events. Such a signal may be drawn either from the main cell array or from a smaller auxilliary cell designed to be so probed.

A charging regime which may be programmed into the micro-controller of the embodiment described thus far will now be described with reference to the flow diagram presented at FIG. 8(a) and continued at FIG. 8(b).

Initially, the micro-controller is assumed to be in the power down energy saving mode (80). When a charging current is detected by monitoring the sensing resistor, the micro-controller is powered to full activity. A timer which will later define the time remaining until the current shunt is activated is re-set. The voltage across the cells is read and stored. After a 30 second pause, the voltage is read again and stored once more. This provides information for the decision (81) to be made on whether the battery was discharged since the micro-controller was last energized. If the battery has been discharged, then a counter is incremented and stored in non-volatile memory to indicate the total number of cycles to date to which the battery has been subject. Either way, at box 82, a decision is reached on whether the battery voltage is sufficient for a reliable measurement to have been likely. If no such measurement was obtained, a loop counter is incremented and provided (83) the loop count has not become excessive, a second attempt to read the battery voltage is made after a pause of 1 minute. If this loop is entered more than 10 times, control passes to a fault routine 810 since the performance of the cells is not consistent with normal operation.

When a reliable reading has been obtained (label (b)) the voltage across the sensing resistor, is measured and the battery current direction computed therefrom. If there is no current flow (84) then the rest mode as described above is entered (85). If the current is not a charging current (in other words it is out of the battery pack) then the discharging regime 86 is entered, this regime is described functionally above. However, if a charging current is present, the magnitude of the current is computed and stored. Should the magnitude of the charging current be too high for the cells present in the battery pack, an alarm routine 88 is entered, which would typically include a visual and audible warning of the dangerous condition as well as a permanent switching of the current shunting arrangement to minimise the actual charging current reaching the cells.

Continuing to that action of the flow chart shown in FIG. 8(b) the present state of the battery charge is recalled from the non-volatile memory and the current shut timer set with a safe time limit for full charge (fast charging) current to be passed to the cells. Subsequently, the cell temperature is read and stored so that a profile of cell temperature with time may be built up. If the cell temperature is within the range (89) for which fast charging is appropriate, then the cell temperature profile established to date is examined to see if the profile is equivalent to that of a full charged cell array (800). If not, after a pause of 1 minute and assuming the timer which has set the fast charging time limit before current shunting is to be applied has not expired (801), control loops back to a point label (a) where a portion of the aforesaid control regime is repeated. An outcome of this iteration is that repeated samples of cell temperature with time are stored and a profile built up which will eventually equate with the full charge profile (at step 800). An adjustment (803) may be made to account for temperature and any extent to which full charge is indicated before the cells are absolutely fully charged, the charge register is then set to full charge (804) for the prevating cell conditions. Whether full charge was reached or not, the current charge level, based on the charging which has occured applied to the previously stored battery charge status, is displayed. At this point (805), the current shunting transistor is switched on so that only a trickle current remains at the cell terminals (for the case of Nickel—Cadmium cell for example).

If it had been that the cell temperature was outside the range for which fast charging could be safely applied (89), then following a display and audible warning, this trickle charge mode would be entered. Either way, after a pause of ½ minute the voltage across the sensing resistor is again measured to establish whether the charing current has yet been switched off. If not, control passes back to label (a).

If charging current is no longer present, a decision is made (807) whether to enter the discharging regime (808) or to power down the micro-controller into the power saving rest mode (809) ready for the next charging current detection to invoke the control regime again.

Figure 6A:
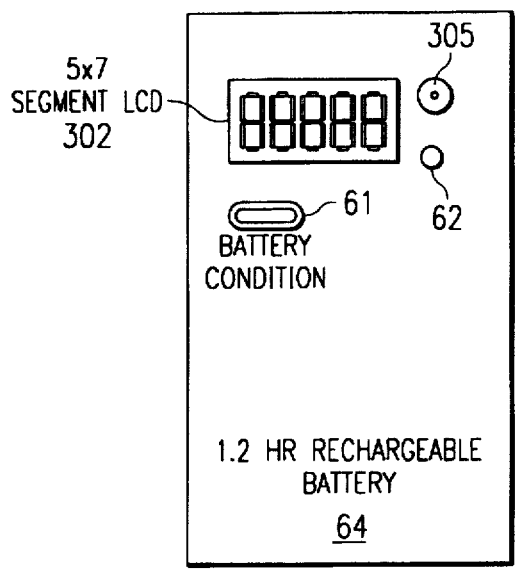
FIG. 6 and 7 shows battery pack layout drawings.
Figure 6B:
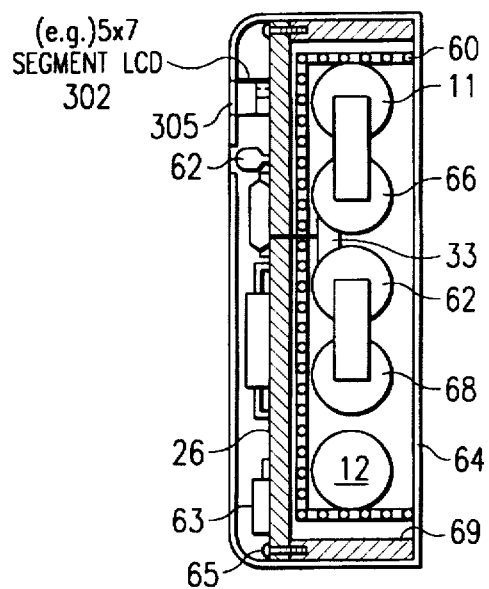

A physical arrangement of the components of an embodiment of the present invention is shown in FIG. 6, wherein where possible reference numerals in common with the other figures hereof have been used. That embodiment will now be described.

An array of re-chargeable cells 11, 66, 67, 68 and 12 is contained within a thermal and electrical insulator 60, thermal sensor 33 contacts the cell array and is mounted on a printed circuit board 26 which carries all the components including the audio enunciator device 305 and the display 302 formed as 5 by 7 segment liquid crystal devices. The arrangement also includes a button 61 which may be pushed when a display of battery condition is required on the display 302. A light emitting diode is also provided on the printed circuit board 26 visible through a case 64 which is arranged to flash when the charge remaining in the cell falls below a predetermined level. The power components (current shunting, for example) of the embodiment are contained in a region 63 of the printed circuit board 26, which is fixed by a screw or snap fitting 65 to a carrier member 69 within case 64.

The embodiment described thus far uses a resistor to sense current flow with respect to the cells, although it will be appreciated that other sensors (hall effect, for example) may be used. In some applications an existing 'thermostat' may be used to provide the sensing element without adding an extra component.

The thermostat is typically a bi-metallic strip contactor placed electrically in series with the cells and in thermal contact therewith. The contacts are set to open to disconnect the cells if an extreme temperature exists. The device has resistance and hence provides a means for current sensing. The thermostat may be arranged to self heat so that is opens for excessive current flow. Here the resistance is chosen appropriate to the energy cell rating.

Alternatively, the arrangement of FIG. 15 may be employed, which shows a thermostat having contacts 150, an input 151 and an output 154. A bimetallic element 153 has a resistance Rs. A third terminal 152 and terminal 154 may be used to provide a sensing element that is unaffected by contact resistance changes.

Figure 4:
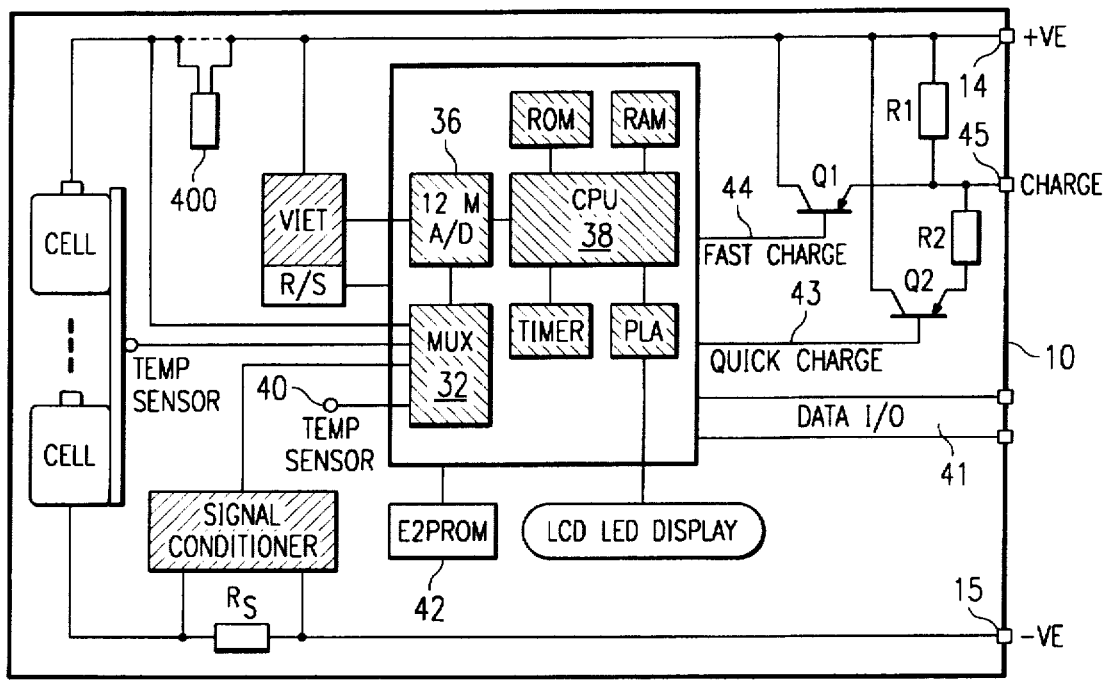

An alternative embodiment of the present invention is shown in FIG. 4, and where parts are the same or similar again common reference numerals have been used. It will be observed that with respect to the embodiment of FIG. 3, interalia the present embodiment additionally comprises a temperature sensor 40 which may pass ambient temperature information to processor 38 via multiplexer 32 and a to d converter 36. This enables further precision in calculations since for example, the effect of ambient temperature may now be included in a computation concerning battery charge status. The arrangement also includes some electrically erasable programmable read only memory 42 which may be dedicated to battery characteristic tracking parameters so that information regarding battery condition or status may be stored and restored by the processor 38. This also ensures that the information will be available even if the cells go through a period of complete discharge and no other power supply is available.

The embodiment is also provided with a bi-directional data input/output bus 41 which may be connected to external devices to enable the transfer of data between the processor 38 and external equipment. For example, the equipment which the battery is powering may receive information concerning cell condition and potential life, and may use this information as a basis for internal control. Alternatively, battery identity information may be passed to a suitably equipped charger which may be configured or self-configured to provide an optimum charging regime for the battery pack. Hence, this embodiment is readily adaptable to various protection schemes and can be reprogrammed externally to some extent by downloading, for example by an intelligent charger or application for an optimum charge current profile.

The present embodiment is provided with a charge regime control arrangement as an alternative to the charge current shunting arrangement of the embodiment previously described. However, it will be appreciated that the charge control arrangement to be described and the aforesaid shunting arrangement may be provided together in a single battery pack.

The present embodiment has an input 45 to which the charger may be connected in addition to positive and negative cell terminals, respectively 14 and 15. The benefit of this arrangement is that three charging regimes may be made available by providing switching transistors Q1 and Q2. When both transistors are off, a trickle charge path is provided via resistor $R_1$. When a control signal is provided by the processor on line 43 to switch Q2 into the conductive state an additional quick charge medium current path is provided via Q2 and resistor $R_2$. When a signal is similarly generated on line 44 transistor Q1 switches on providing a full current fast charge path. The operation of this arrangement will now be considered in more detail with reference to FIG. 5 which shows a circuit diagram of the charge control arrangement. The quick charge signal provided on line 43 by the processor 38 is connected to terminal 50. The fast charge signal provided on line 44 is connected to terminal 51 to control Q1 via Q4. An additional terminal 54 can provide a conditioning discharge regime when energized by a signal from the processor (not shown in FIG. 4), it being known that Nickel Cadmium cells for example, can develop a "memory effect" which prevents full charge capacity usage being sustained and that this may be overcome by running the battery down periodically to the substantially fully discharged condition and then fully charging the cells. When both transistor Q1 and transistor Q2 are off, a trickle charge path is provided via resistors 52 and 53, with some control provided by switching Q8. A switch for complete disconnection may also be provided.

The arrangement is shown with alternative battery chargers; the high impedance charger 55 (as might be used presently with Nickel Cadmium cells) and the voltage source charger 56 (as might be used presently with lead acid cells). It will be appreciated therefore that regardless of the cell type being charged, the control arrangement allows the use of substantially any type of charger. Onset of full charge can be indicated by an audible and visual warning that the charger should be disconnected.

The operation of the arrangement under various conditions will now be described.

Discharging

On a periodic basis, say once per second, the current flowing through the current sensing resistor, Rs (for a 5 cell battery pack 0.020 Ohms in series with the cell's internal impedance will result in less than 0.5% additional power loss), the cell's voltage, the cell's case temperature and the ambient temperature are measured and stored.

When connected to an application, discharging current flows; with the aforementioned measured data the microcontroller calculates the delta charge loss (temperature normalised), subtracts this from the previously displayed charge, then displays the charge remaining in the battery on the LCD or LEDs; a graphical 5-step display would imply a ±10% overall accuracy. For large discharge currents the voltage drop across the cells' internal resistance, cell temperature corrected, must be subtracted from the cells' terminal voltage in order to determine the available electromotive force of the cells, especially when absolute voltage levels are programmed to indicate the cells' low and no charge thresholds.

Low Current Discharging

Two categories of currents must be considered, namely the self discharge current (including the currents taken by the charge measurement system) associated with the cells when the battery pack is open circuit, and small leakage currents' taken from the battery pack, typically, by applications in their 'OFF' or 'standby' state. The self discharge current is generally exponential with time as its magnitude is a function of the charge present in the cells. An equation or table can be programmed to use the time constants input for the cell technology and the measurement system can then include the charge loss corresponding to the time the battery pack was in its open circuit state.

The voltage range set by the 12 bit Analogue-to-digital converter in conjunction with Rs (0.020 Ohms) enables the microcontroller to detect currents greater than ±10 mA. Currents of this and lesser amplitudes (for example the 'leakage' current taken by a video camera when it is switched off) flowing through the very low internal impedance of the cells results in a negligible voltage loss; the relatively predicatable temperature corrected delta 'open circuit' voltage versus 'delta charge loss' law (in the region 15% to 85% typical discharge levels) for the cells can be used in determining low discharge current charge loss. Having 0.2 mV measurement resolution for example, the microcontroller system is thus able to compute the charge loss corresponding to low currents from the cells using this delta open circuit voltage scheme then ensure that the result lies between the computed 'self discharge' charge loss and charge loss equivalent to a current drain of 10 mA (minimum current resolution) for the corresponding time period. This method overcomes the need for having the measurement system resolve currents lower than ±10 mA.

Charging

In the absence of a charger, and when not conditioning the cells, the microcontroller holds Q4, Q5 and Q6 OFF. When a charger is connected to the Charge terminal of the battery pack, the voltage at the emitter of Q7 rises above its base (battery pack) voltage thereby turning Q7 ON; the resultant 'hi' voltage at the collector of Q7 is divided by the potential divider R13, R14, then directed to bring the microcontroller out of stand-by mode. The latter immediately takes control of the charging of the cells.

Q8 permits the microcontroller and its supporting circuits to be powered either from the cells of the battery pack or from the charging source; charge control is thus assured even when the cells are completely discharged.

A maximum fast and quick charge time as a function of the computed average charge current is set for each charge by the microcontroller; after this interval, Q1 and Q2 are switched OFF allowing only trickle charge currents into the cells. This is a safety feature. For added security and cell protection, the microcontroller is also programmed not to fast charge a battery pack that has charge greater than 90% (redefinable) of its full charge capacity; trickle top-up charging ensures full charge.

The cell manufacturer may also set temperature limits outside which fast or quick charge is not permitted; these may be programmed into the microcontroller's software routine. Also defined for the cell type may be the maximum peak and the maximum average fast charging currents. When not equal, pulse width modulation of the higher current to average it to that specified is used. For example, periodically switching from high current to medium current or trickle current and repeating to give a computed average value of current.

Fast Charging

On connection of the Charger to the battery pack, the microcontroller immediately turns ON the Fast charge transistor Q1 by outputing a 'hi' voltage at the base of Q4 through the current limiting resistor R6; LED D1 illuminates, signalling Fast Charge currents. If the current through Rs is computed as less than the maximum for the cell type and less than the average charging current limit preprogrammed, Q1 remains ON through to 'full charge' detection or timeout. Batteries left unused for a long time show an increased internal resistance; if fast charged in this state, decreased battery life may result. The cell voltage is therefore compared to a stored upper limit; if it exceeds it, Q1 and Q2 are switched OFF permitting only trickle charging (or Quick Charging if specified by the cell manufacturer).

However, if the current through Rs is computed as less than the maximum peak for the cell type but greater than the average charging current preprogrammed, Q1 is initially held ON for at least 3 seconds to permit fast chargers with open circuit maximum voltage detectors to acknowledge the presence of the cells, then the microcontroller switches Q1 ON and OFF cyclically thereby pulse width modulating the charging currents so as maintain an average charge current that is below the maximum for safe and efficacious charging. Should say a 4 second cycle be used, and a '1C' average charge current is recommended, the typical fast charge operation will be, Q1 ON continuously for a '1C' DC charger; Q1 ON 2 seconds OFF 2 seconds for a '2C' DC charger and Q1 ON 1 second and OFF 3 seconds for a '4C' charger. Case temperature measurements are made immediately at the end of each fast current pulse.

Quick Charging

If the charging current computed exceeds the maximum peak limit set for the cells, Q1 and LED D1 is turned OFF within milliseconds of being ON to avoid damaging the cells, then Q2 is turned ON; so doing illuminates LED D2 to indicate 'quick charging' in progress. The Q2-R2, Q3-R3 resistor arrangement will limit the quick charge current to the cells to approximately 300 mA, whether the power at the charge input of the pack is a current source or a voltage source. Resistor R1 has a dual role: a) it serves as a path for the trickle charge current when transistors Q1 and Q2 are OFF and b) it enables computation of the voltage at the pack's charge input. Knowing the current limit set for Q2-R2, the total current into the cells is I-Q2R2 plus the current I-R1 resulting from the volts drop across R1; therefore from the cell current data, the charge voltage may be computed. If a preprogrammed limit corresponding to the full charge voltage of a lead acid car battery is exceeded, Q2 is turned OFF to avoid self overheating.

Trickle Charging

When Q4, Q5 and Q6 are OFF and a power source is at the charge input, the trickle current is defined by the voltage drop across R1; specifying the charge input voltage to 16V absolute maximum makes the maximum trickle current 80 mA for completely discharged cells, and 45 mA when the battery pack's voltage is 7V. Typically a 5-cell charger will voltage clamp in the 10V region thus giving a 50 mA maximum (zero cell voltage) and 15 mA (7V at battery pack) trickle current. R1 can also be redefined to meet the trickle charge current requirements of the cell technology in use.

An alternative algorithm where the trickle charge current and voltage conditions are tested and which then progresses on the Quick Charge conditions and finally to Fast Charge conditions can also be implemented should the cell manufacturer so recommend.

Full Charge Detection

Two means for 'full charge' criteria are programmed. During charging, comparison of the cells' case temperature profile and terminal voltage profile are made to those stored in memory and representative of the onset of full charge for the cell type determined. If the magnitude of the charging current is then computed to be below the threshold requiring full charge supervision, no change to the charge current is made, otherwise the charging current is reduced to a trickle current by switching Q1 and Q2 OFF. The charge corresponding to the onset of full charge is stored in the memory of the microcontroller system; the maximum charge for the cells will therefore be reached by top-up trickle charging for a computed time period. As the trickle charge current will be greater than that for the cells' self discharge, the battery pack will be assumed 'full' until charge is withdrawn from it.

Battery Conditioning

Figure 5:
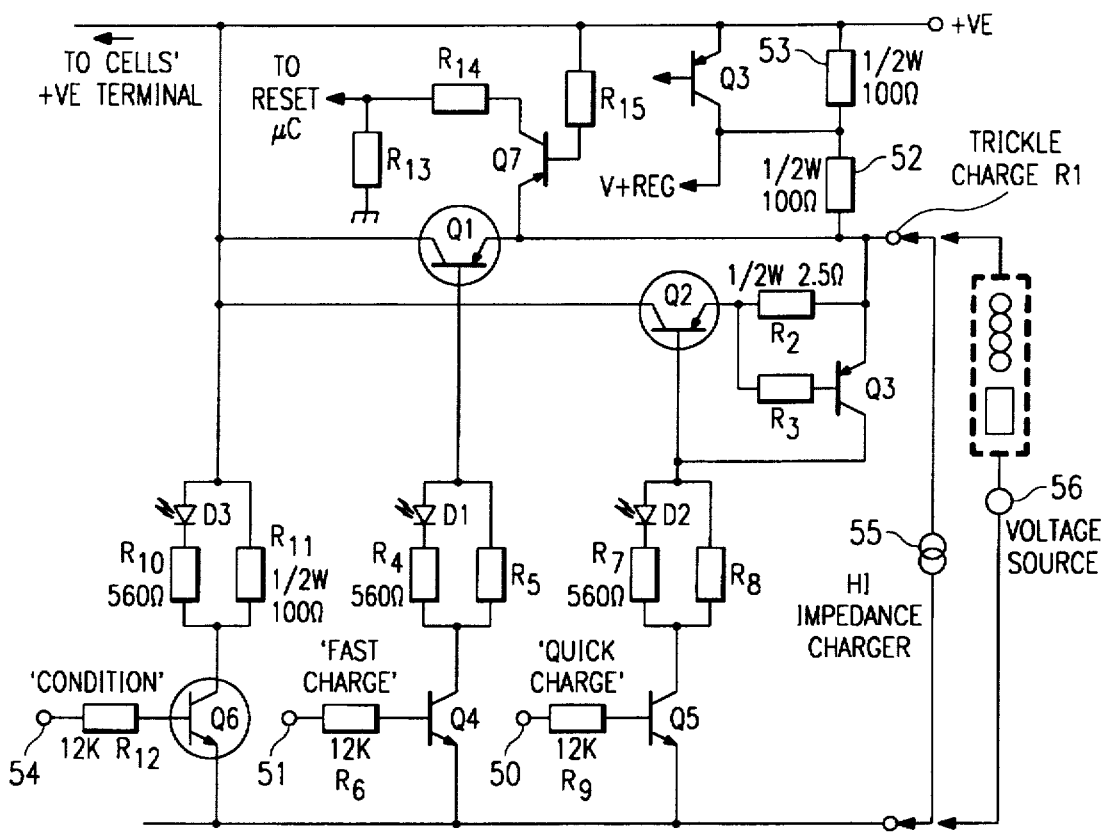
FIG. 5 represents in more detail an expanded portion of the circuit of FIG. 4.

When the microcontroller measures a cell voltage corresponding to a preprogrammed limit of say 10%, charge remaining in the cells and no current is taken by the application, it proceeds slowly to discharge the cells to a predetermined voltage level. This redresses any memory effect and results in increased efficiency of the battery pack. In FIG. 5, Q6 a Darlington transistor is switched ON to allow the conditioning current to flow through R11 and the LED D3. For a 5 cell battery pack with R11 equal to 100 Ohm, the conditioning current will be approximately 50 mA. On sensing external current flow into or out of the battery pack, the conditioning current is immediately switched off.

Another conditioning regime would be to follow discharge with a fast charge. In any case, it will be appreciated that the battery capacity will be known at all stages of the process due to charge tracking by the processor.

It will be appreciated that provided the total cell voltage remains within the operating range of the circuit elements, the described embodiment of the present invention may accommodate differing battery technologies by 'software' changes. For example, the same embodiment could manage cells with a 'zero charge' voltage of 3.8v and maximum full charge voltage (including fast charge voltage drop) of 18 volts.

Also shown in FIG. 4 is the position (400) which a combined thermostat/sensor of the type shown in FIG. 15 may occupy.

FIG. 9 details the circuit diagram used for the microcontroller and its supporting elements. The main block is the microcontroller with the LCD display LCD1. Integrated circuit U2 is the E2PROM which at present contains the entire software for the system; debugging thus does not require hardware mask changes a fully masked arrangement is envisaged, however. The temperature sensors RT1 and RT2 are of the silicon diode type with a constant current directed through them during temperature measurements. The Reset circuit gives a logic '0' signal to the microcontroller when the battery voltage falls below a preprogrammed value (around 3.7V for a regulated Vdd of 3.5V), then with its hysteresis does not permit the return to a logic '1' until the battery rises say 200 mV above the first threshold voltage.

The regulator is realised with a micro current Opamp U3A and a micro power Voltage regulator D2. Voltage regulation is achieved even with the battery voltage 200 mV above the regulated Vdd voltage. Further power saving is being achieved by biasing the Opamp and the Voltage regulator from the regulated voltage (a start-up resistor from the base of Q3 to ground then necessary).

By changing the technology from for example Texas Instrument's 2-micron generic to e.g. LinBiCMOS the design of a one chip charge meter with on chip voltage regulator and supervisor, E2PROM and other descrete components becomes possible permitting significant cost and space reductions.

Figure 10A:
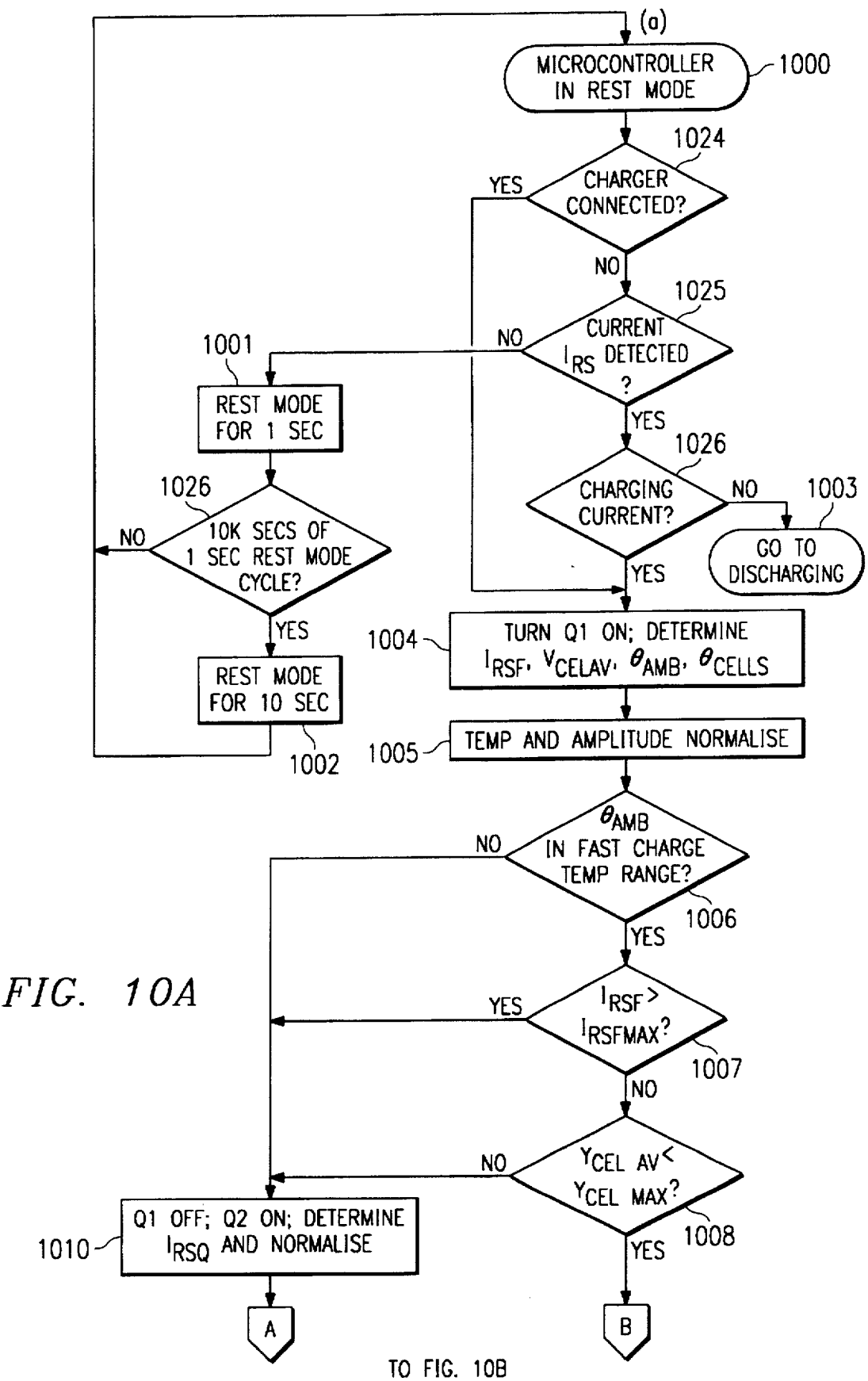
Figure 10B:
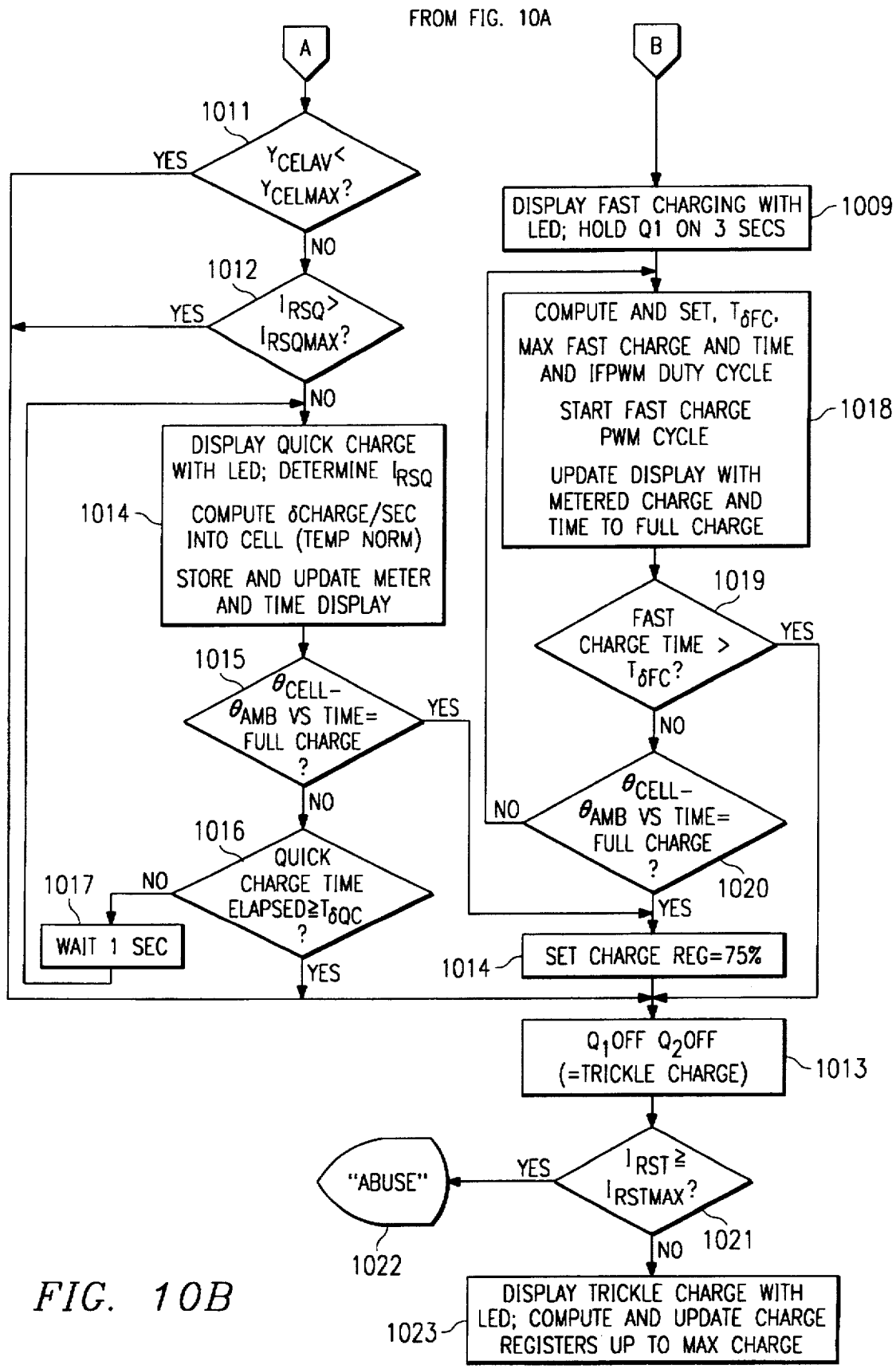

The operation of this embodiment will now be described with reference to the flow chart of FIG. 10. In the description, the following variable names will be referred to:

| | |
|---|---|
| Rs | Battery pack series current sensing resistor |
| Vrs | Voltage measured across the sense resistor Rs |
| Ifpwm | Av fast charge current during PWM cycles |
| Irsf | Fast charging current |
| Irsfmax | Max fast charging current |
| Irst | Trickle charging current |
| Irstmax | Max trickle charge current |
| Irsq | Quick charging current |
| Irsqmax | Maximum programmes quick charge current |
| Imaxpk | Max peak charge current permitted |
| Vpak | Voltage across all cells |
| VcelAv | Voltage across all cells divided by number of cells |
| Vcelmax | Max permitted cell voltage (Irs < Imaxpk) |
| Tδfc | Max fast charge time based actual charge and computed charge rate for the given battery capacity |
| θamb | ambient temperature |
| θcell | cell case temperature |

Operation begins with the micro-controller in its rest mode (1000) as described above. When connection of the charger is sensed (1024) and if there is no current Irs through the sensing resistor (1025), the microcontroller is returned to the rest mode for 1 second. If this previous step has been performed less than 10,000 times, control loops back to point (a), if the 10,000 count has been exceeded, the rest mode period is extended to 10 seconds (1002).

If the current detected at 1025 is not a charging current (1026) control passes to the discharging regime as described above (1003). Otherwise, transistor Q1 is turned on and a determination made of the parameters Irsf, Vcelav, θamb and θcells (1004). The cell voltage readings are then temperature and amplitude normalised (1005). If the ambient temperature (θamb) is outside the range for which fast charging may be safely undertaken (1006) then control passes to establish a quick charge regime (1010) by turning transistor Q1 off and quick charge transistor Q2 on. At the same time, Irsq is measured and normalised. If the average cell voltage (Vclav) exceeds the maximum allowable cell voltage (1011) or the sensed current exceeds the allowable maximum (1012), then control passes to the trickle charge state (1013) by turning off both transistor Q1 and transistor Q2. Otherwise, extended quick charging mode is entered 1014, in which the quick charge indicator is illuminated, current is sensed, the charge rate per second is computed, and the battery condition and/or time display updated. If the measured cell temperature profile equates with that indicative of full charge (1015) then the trickle charge mode 1013 is again entered except this time the charge register is set to 95% (1014). If full charge has not been reached and the maximum quick charge time has elapsed (1016), trickle charge mode is also entered (1013) but the charge register is not set to 95% but left at its computed value. If the quick charge time has not been exceeded, measurements are again made after a delay of 1 second (1017).

If the ambient temperature is within the fast charge range (1006), then a test is made to see whether the sensed current exceeds the maximum allowable current (1007), and whether the cell voltage exceeds the maximum allowable (1008). If either of these conditions are true, quick charge mode is entered via step 1010 rather than the fast charge mode. On the contrary, if fast charging may safely be performed the fast charge transistor Q1 is held on with the fast charge indicator illuminated for 3 seconds (1009), the micro-controller is programmed then to compute and set the temperature profile, measure the required parameters and compute a pulse width duty cycle to arrive at the appropriate fast charging current if appropriate. The display is also updated with the metered charge and the time to full charge as well as the pulse width modulated current cycle being commenced (1018). If the maximum allowable fast charge time is exceeded (1019), then the trickle charge regime is entered (1013). If full charge has not yet been reached (1020), then control loops back to steps 1018 for measurement updates, fresh computations and pulse width modulation.

When the recorded temperature profile with time is indicative of full charge (1020), then the charge register is set to 95% (1014), and the trickle charge regime (1013) is entered. The current through the sense resistor Rs is again measured and if the maximum is exceeded, then a warning/ emergency procedure is entered (1022). Otherwise, trickle charge is maintained with the trickle charge indicator illuminated. After a computed interval of time to allow for top-up charge, the charge indicators are updated with the charge register set to full charge for the determined battery capacity (1023).

Figure 11:
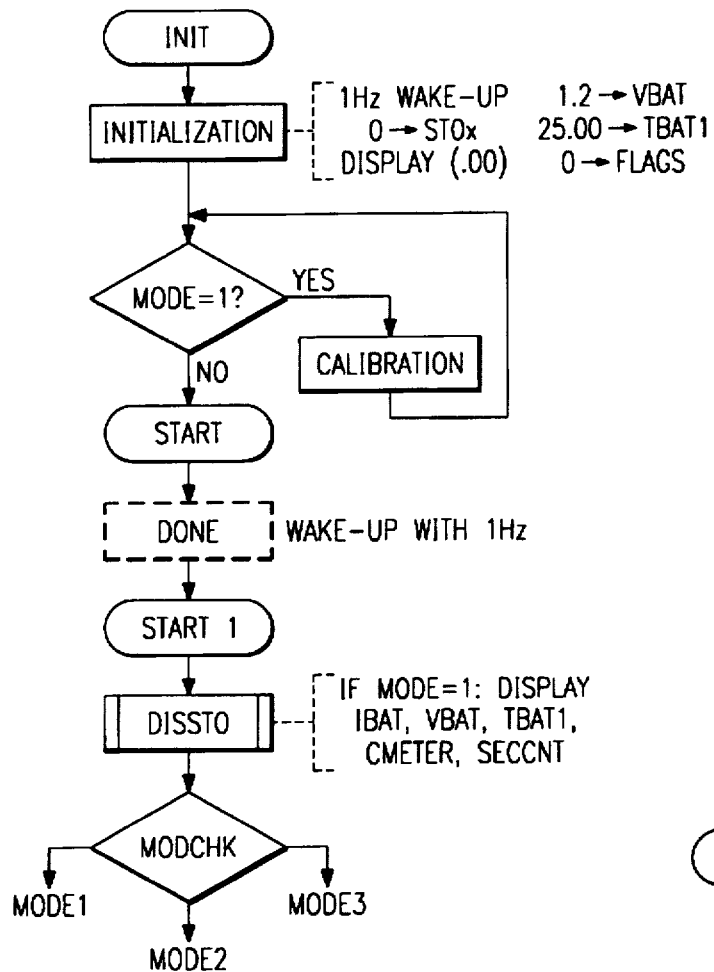
Figure 12A:
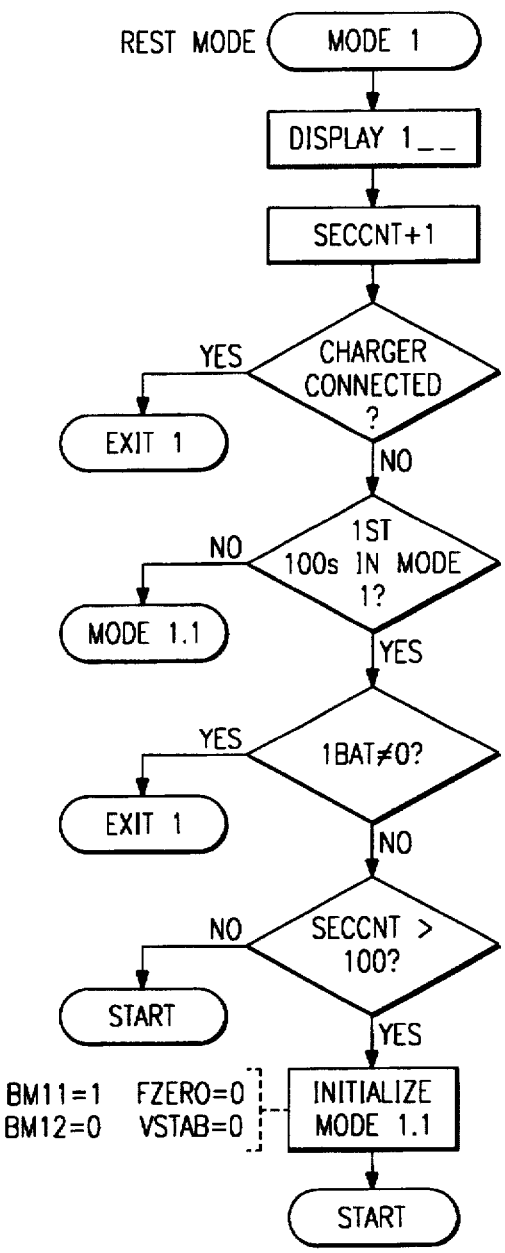
Figure 12B:
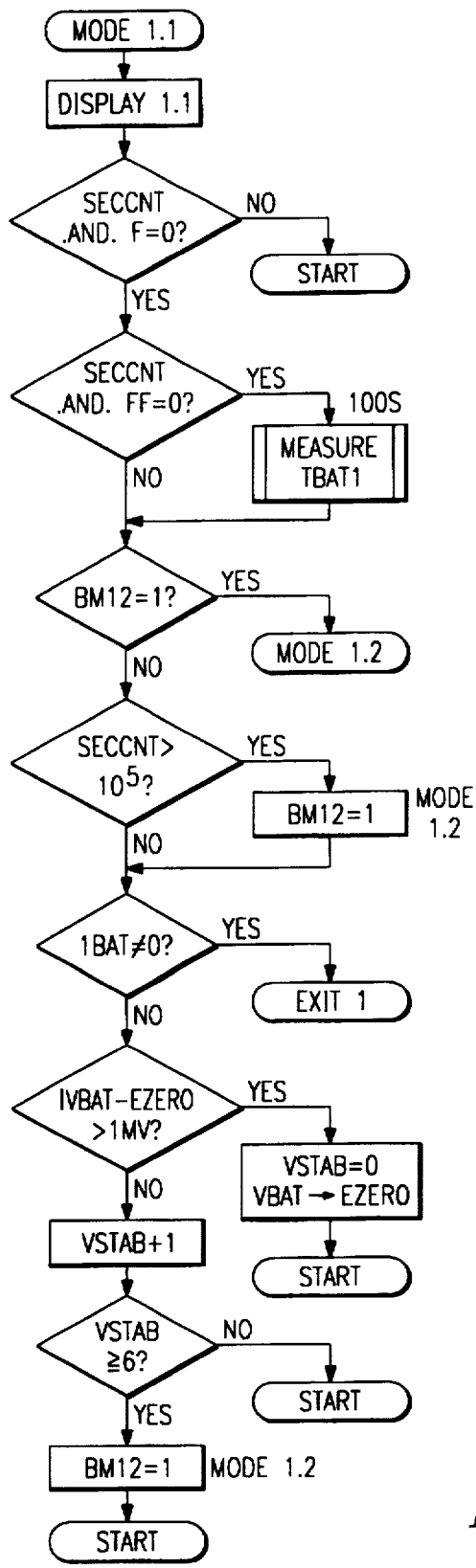
Figure 12C:
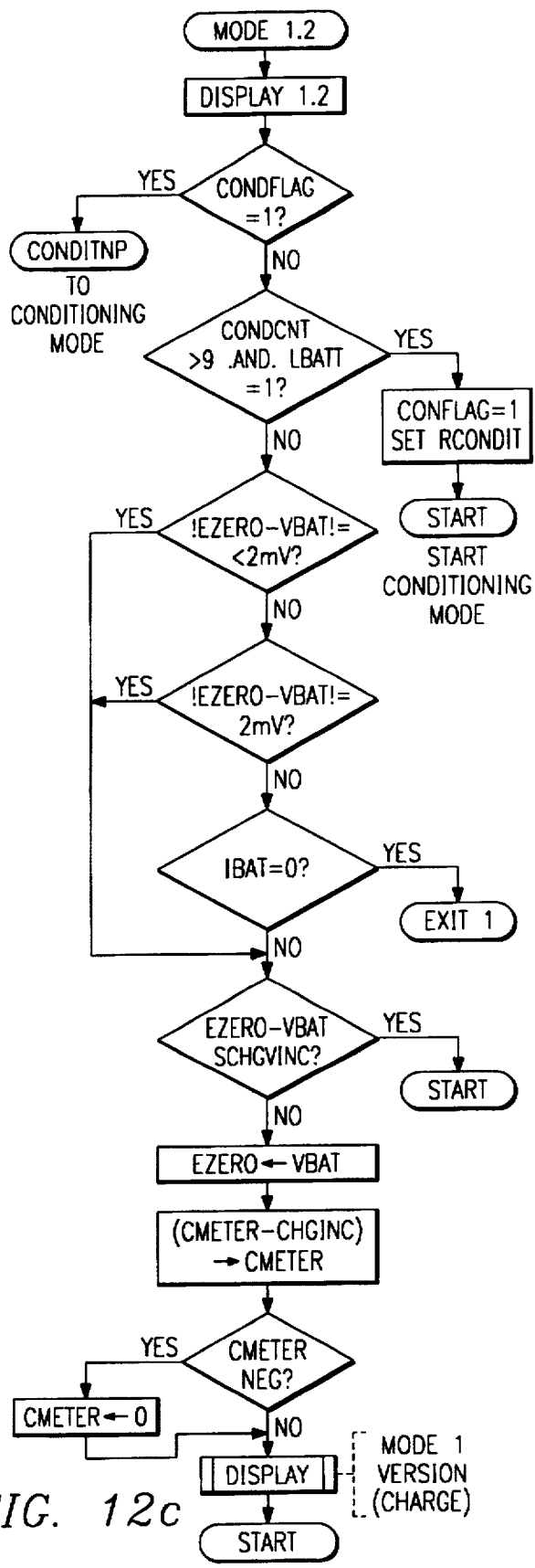
Figure 12D:
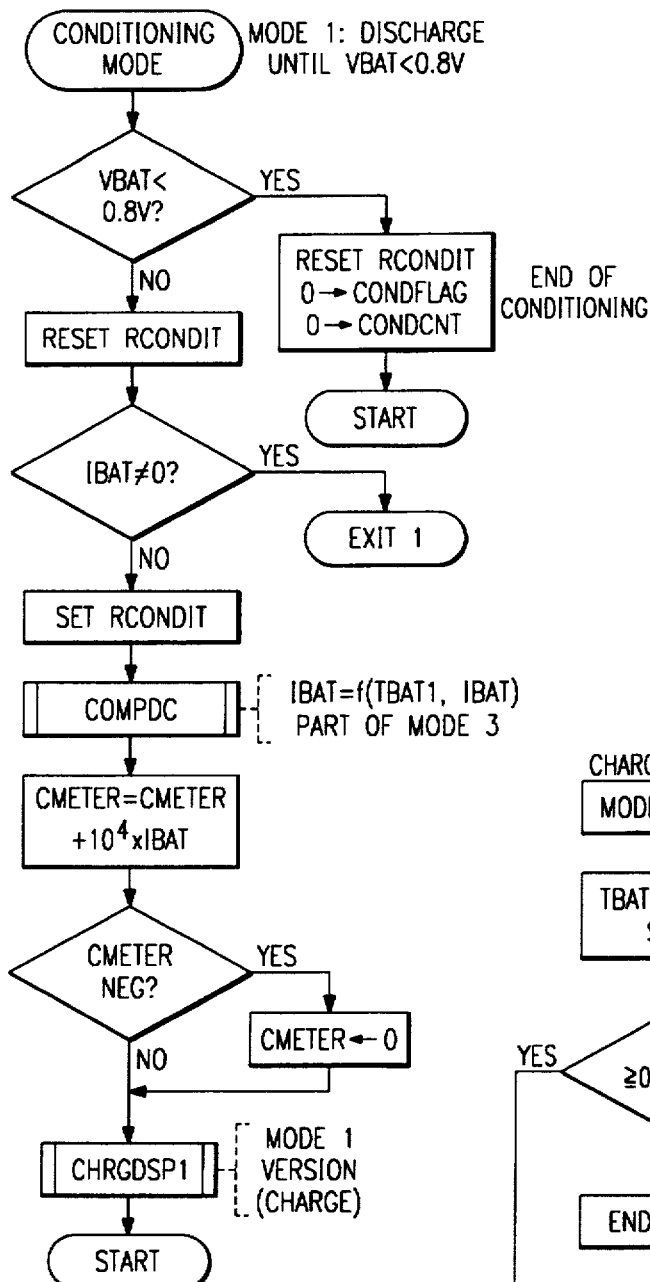
Figure 12E:
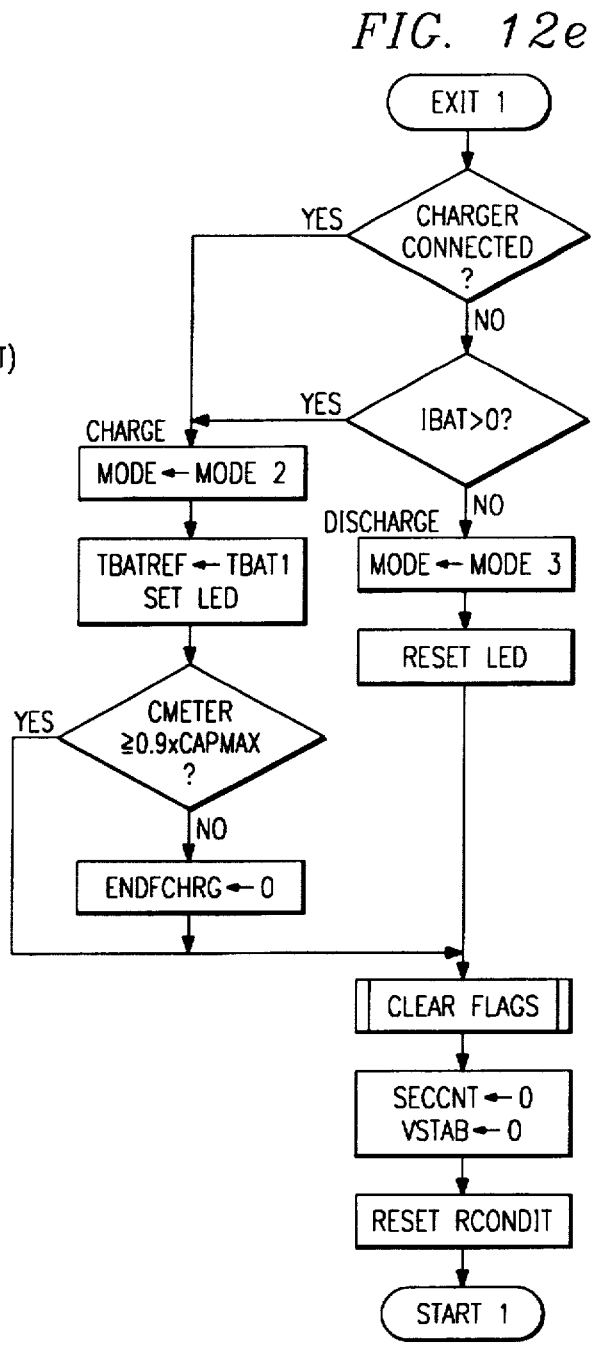
Figure 13C:
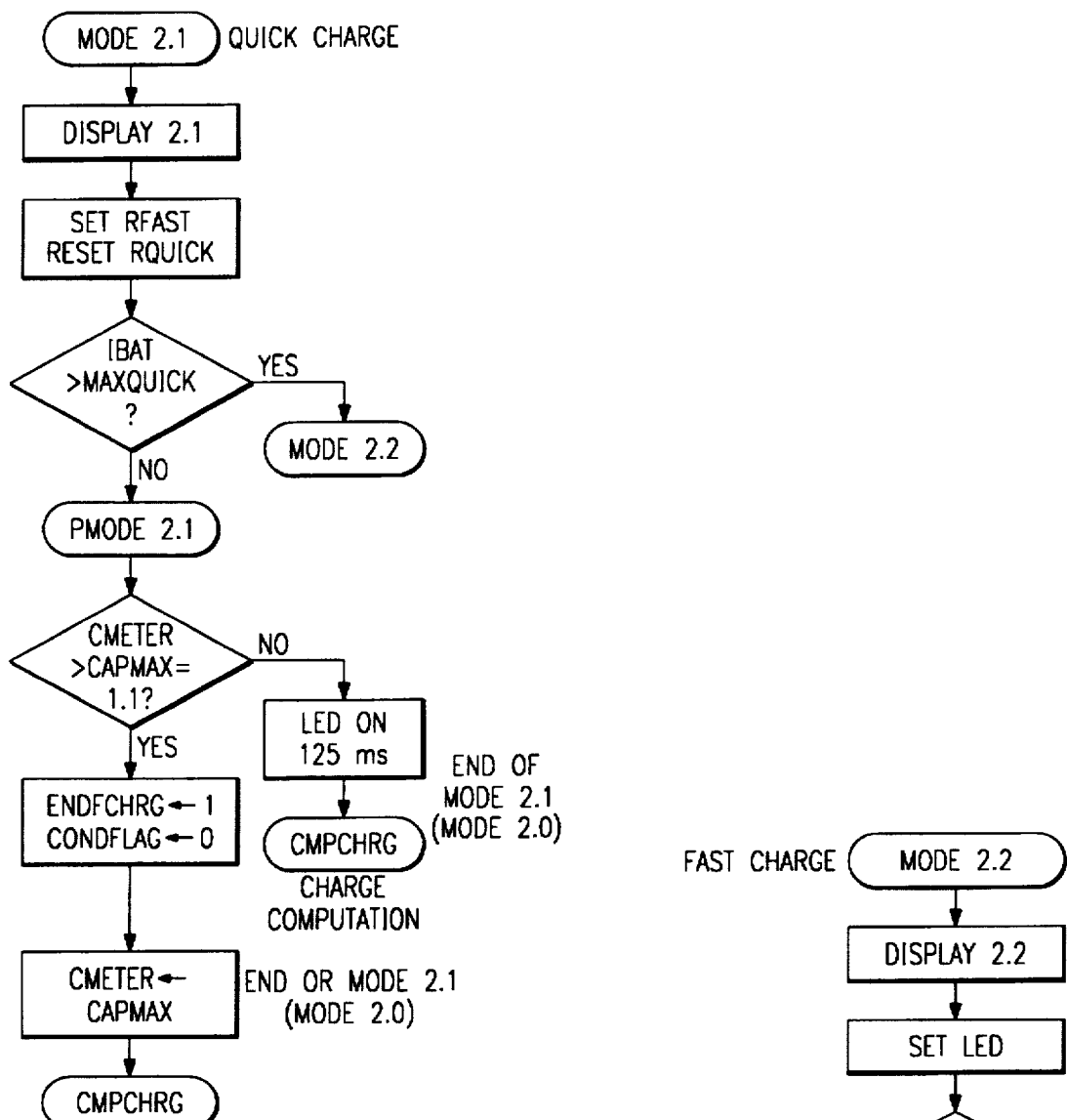
Figure 13D:
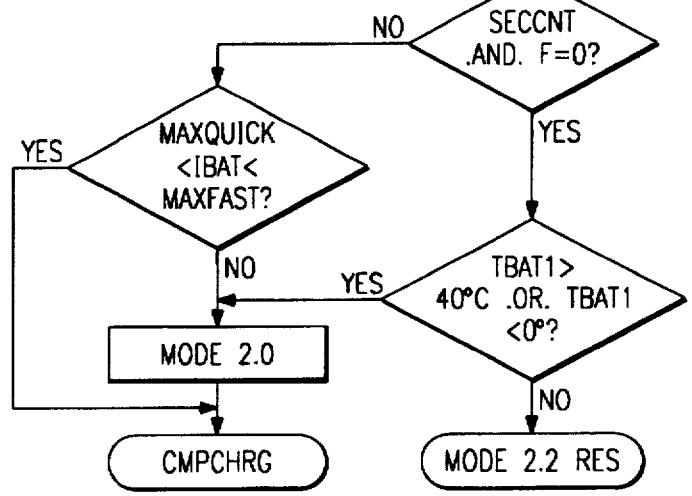
Figure 13E:
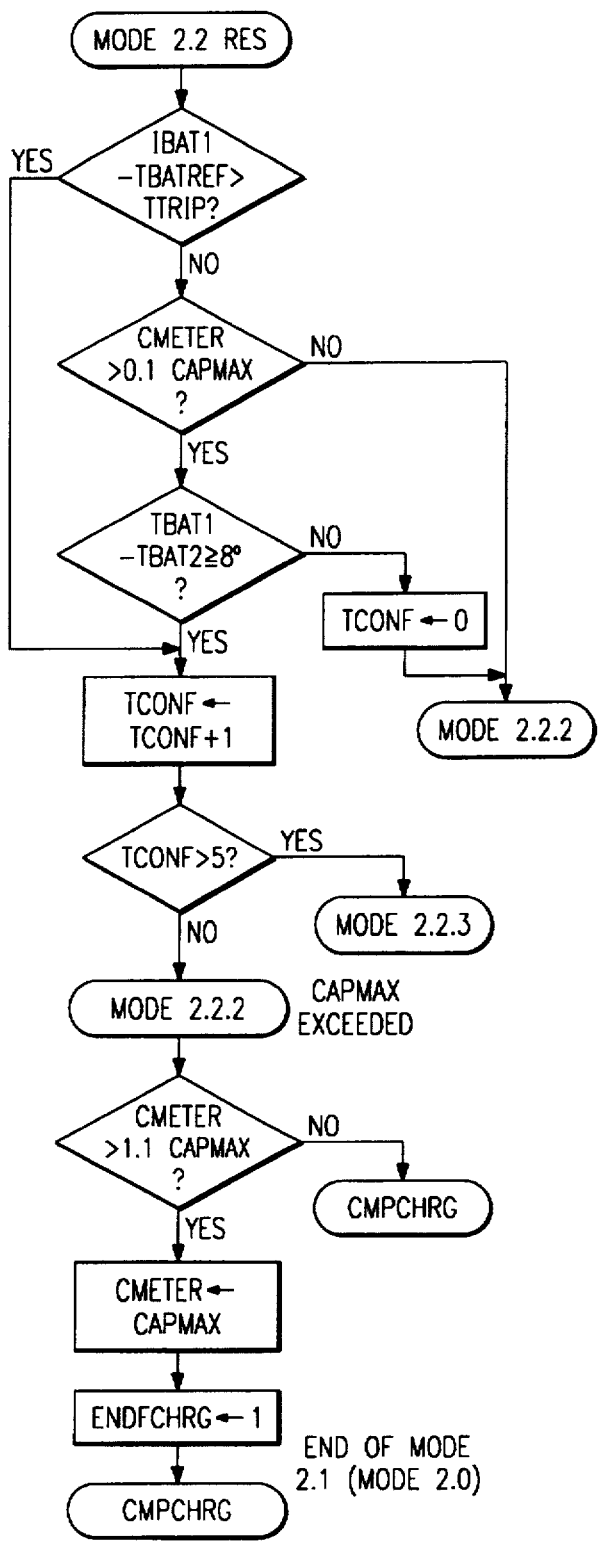
Figure 13F:
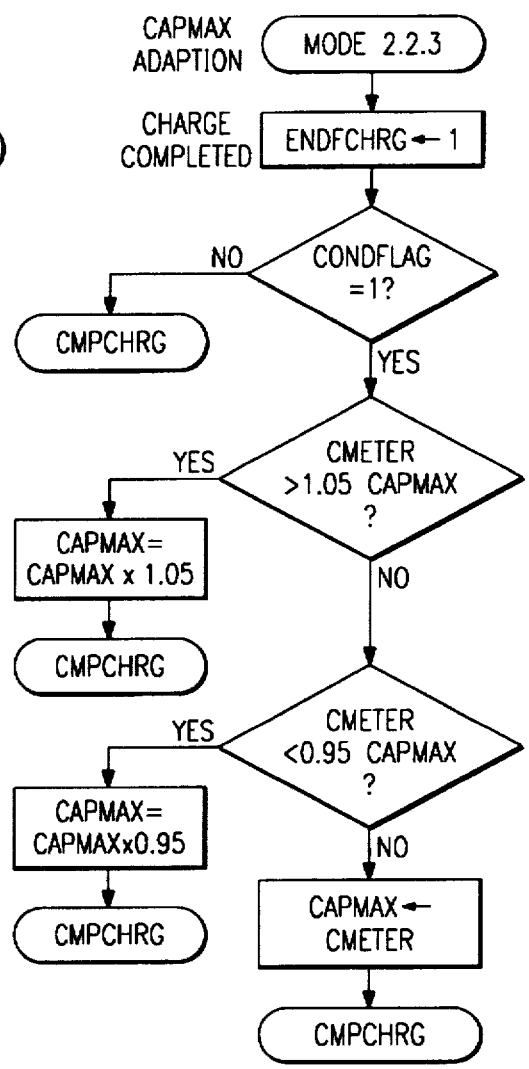
Figure 13G:
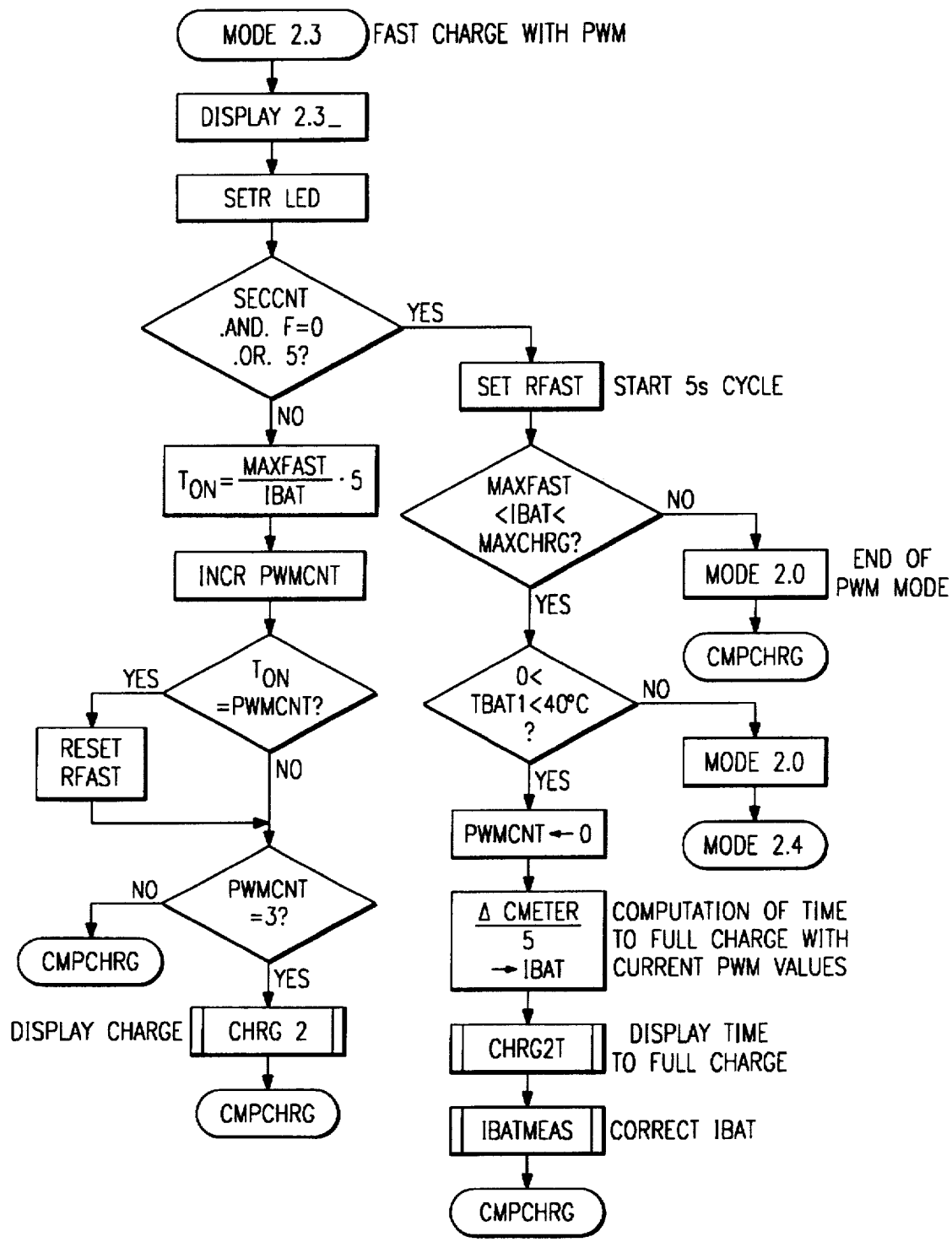
Figure 13H:
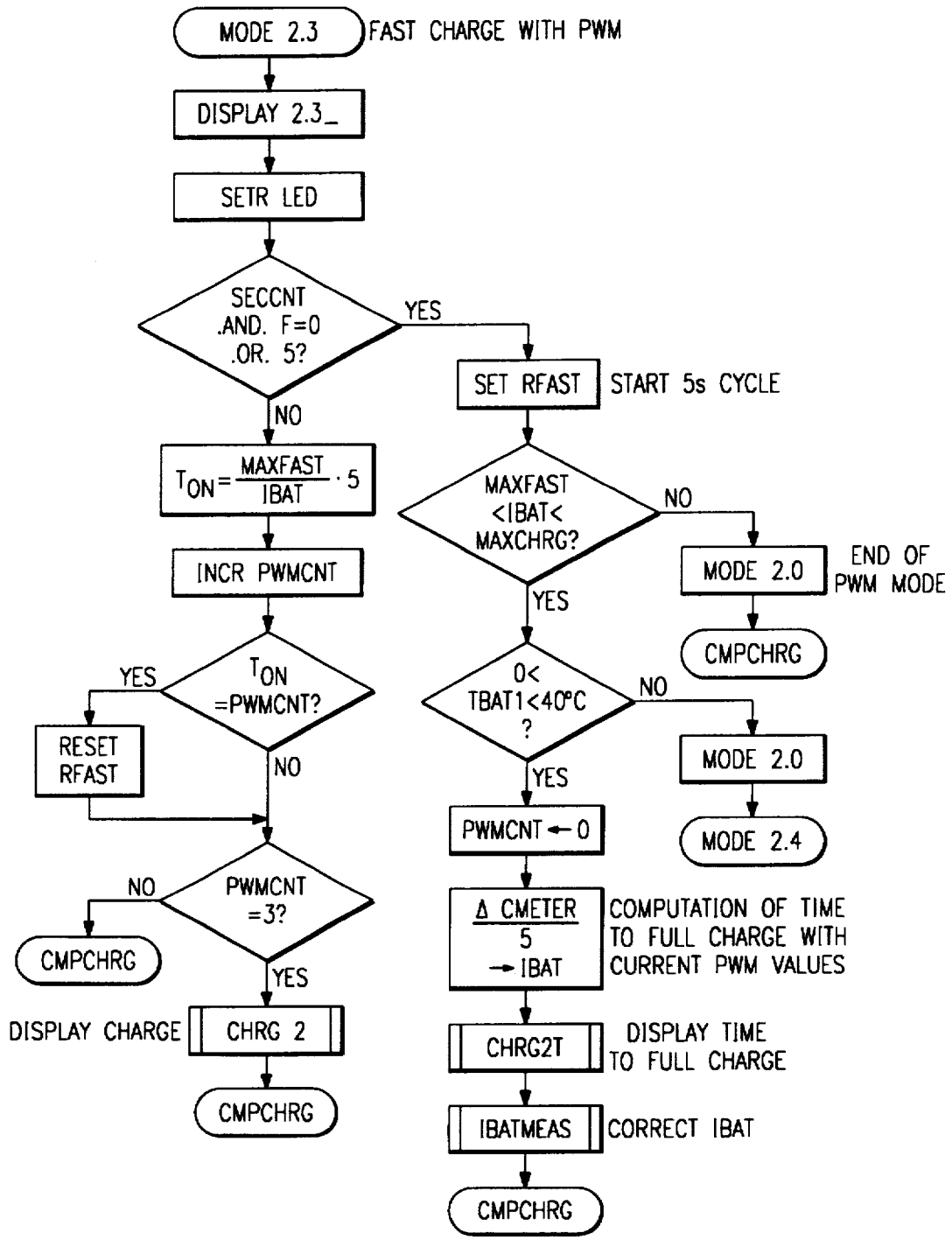
Figure 13I:
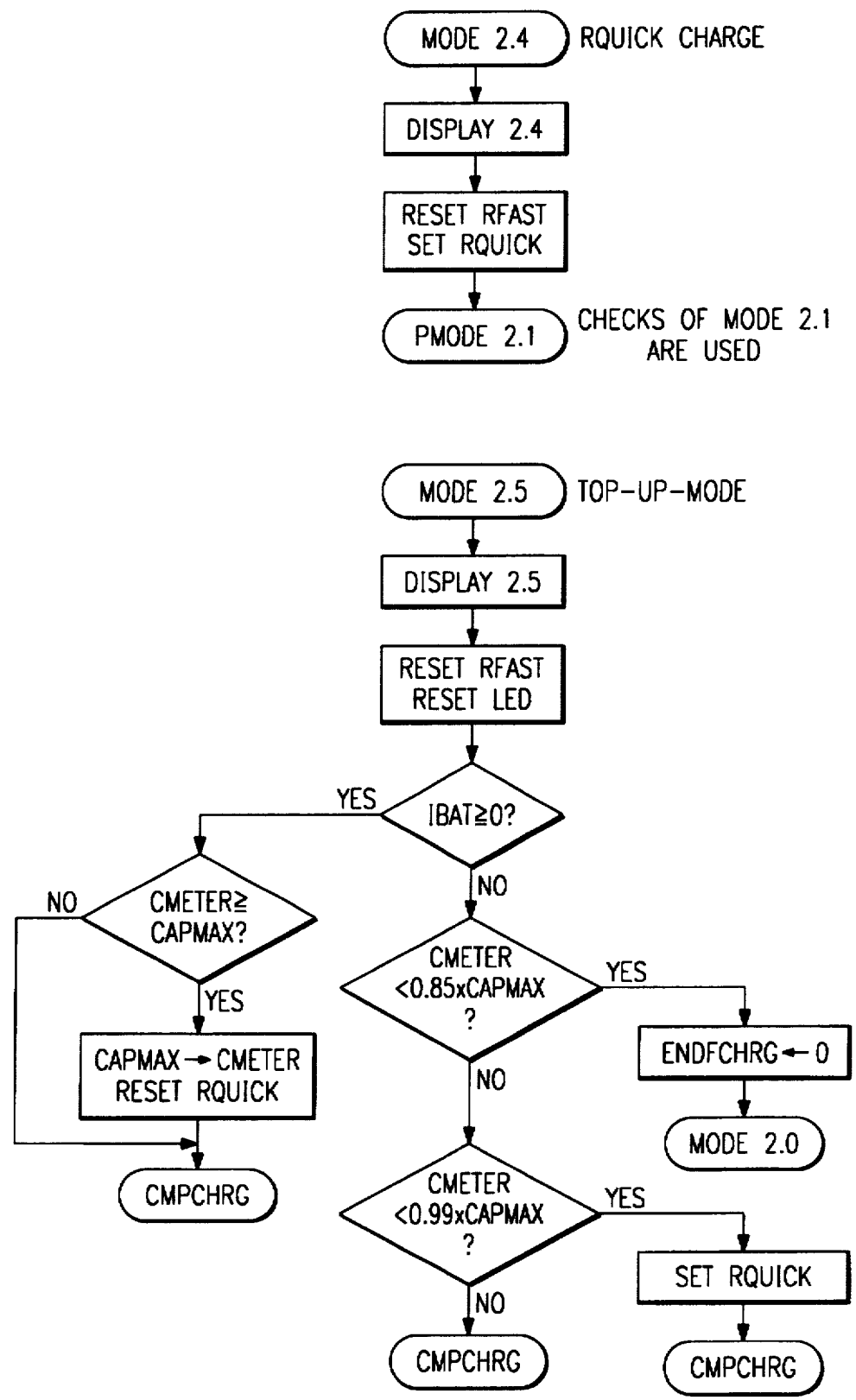
Figures 13J, 13K:
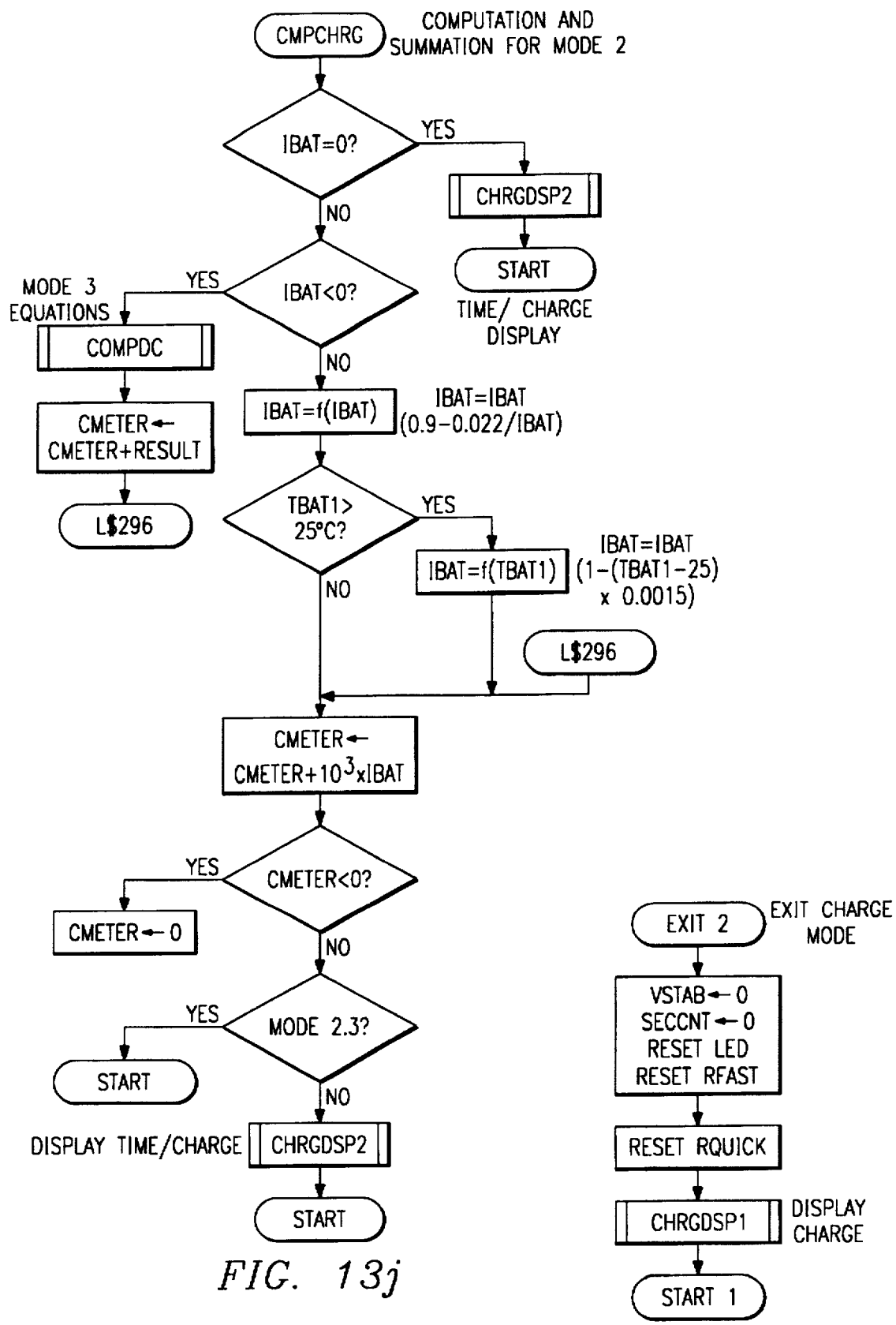
Figure 14A:
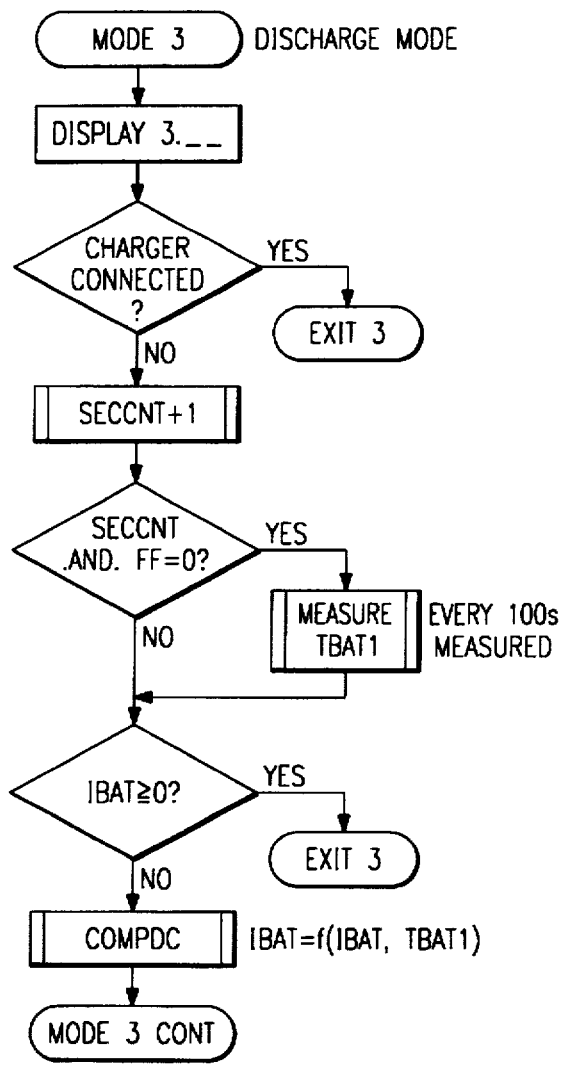
Figure 14C:
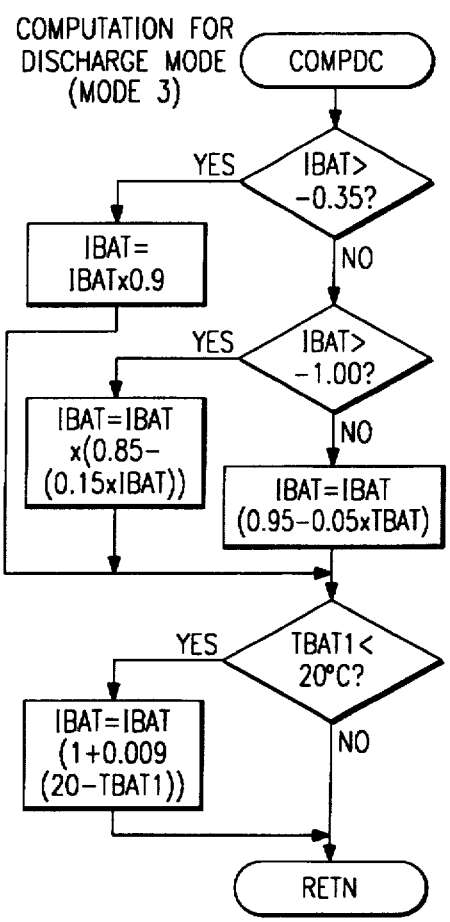
Figure 14C:
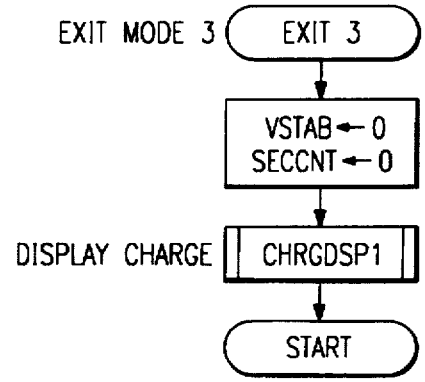
Figure 14B:
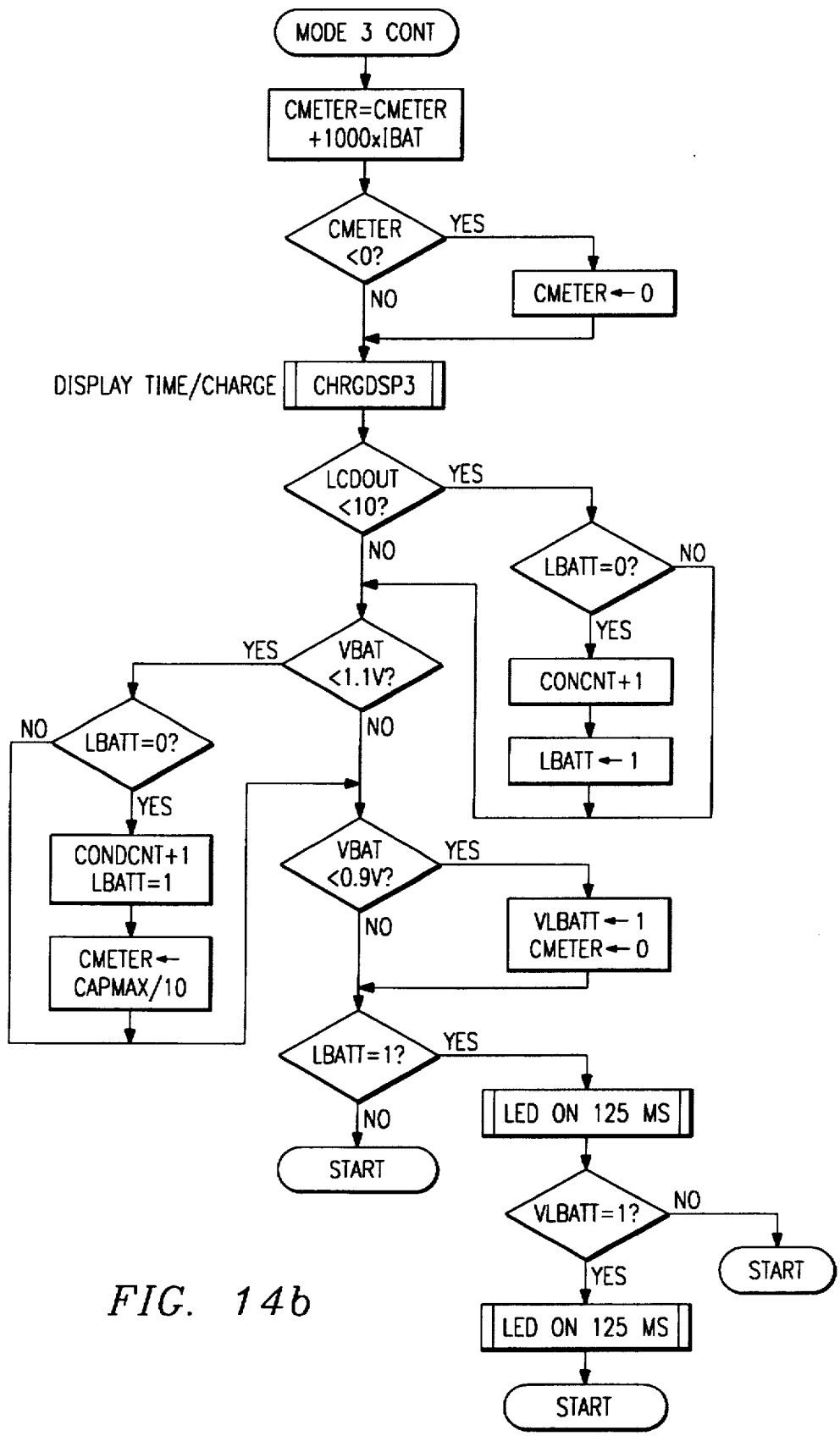

A more detailed elaberation of operation will be appreciated from FIG. 11 to which illustrates all operating modes, as follows:

FIG. 11: initialisation and branch to mode.
FIG. 12 (a to e): mode 1 (Rest Mode),
FIG. 13 (a to k): mode 2 (Charge Mode), and
FIG. 14 (a to c): mode 3 (Discharge Mode).

A particular feature that will be noted from FIG. 11 is that of calibration. Embodiments of the present invention may be arranged to undergo a calibration on initial assembly which permits a measurement accuracy equivalent or surprising that available with analogue arrangements based on instrumentation amplifiers without the cost of the latter. The configuration of the micro-controller relevant to calibration is shown in FIG. 16.

The micro-controller 1600 includes and analogue to digital convertor 1601 (already described) and a current generator 1602. With no connection to terminals 1604, 1605 and when calibration is required (on first assembly, for example) the current source is energised and current flows to system ground (1607) via $R_{bias}$. The voltage present at the convertor input is measured and stored in PROM 1606 as a value representative of zero cell voltages, the cells being fully discharged. To complete calibration a known current (supplied by connecting a known calibration source 1608) is supplied and another measurement taken. Calibration is now effected since the two fixed points enable calculation of both offset and gain of the measurement system.

The arrangement may be similarly calibrated for voltage and temperature with values being stored in PROM 1606. It will be appreciated that calibration may be performed as part of assembly and with no external instrumentation. Calibration can even be made without cells in place if a suitable alternative is connected.

Continuing with the example of current calibration, the converter value measured with the current generator 1602 on above is defined as zero so that, with a 12 bit convertor, there can be 2048 steps positive (charge) and 2048 steps negative (discharge). A two step guard band is employed. The actual value assigned to the maximum convertable value is determined by connecting the known (relatively high) current source 1602.

It will be appreciated that using a known current generator 1602 to shift the value a zero away from true zero eliminates the effect of offset (a particularly problem if of any measurement were to be used) and enables reliable factory calibration to be achieved automatically without the need to perform adjustments.

Also permitted is a high resolution (350 µV step, for example) with a low value of sensing resistor (20 m Ohms). This is advantageous since it allows, at a battery current of 7 amps, the design goal of 1 watt power dissipation to be met. This value of sense resistor also becomes integratable since absolute value is unimportant due to calibration.

Figure 7:
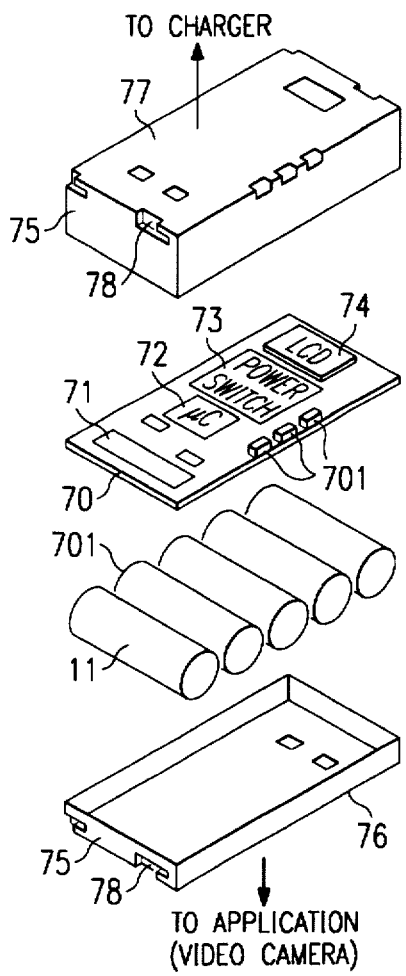

A physical realisation of the embodiment described above is illustrated in FIG. 7. Rechargeable cells 11 are connected to a printed circuit board 70 bearing components making up the embodiment, including thermistor 71, microcontroller 72, power components 73, display 74 light emitting diodes 701 and switches 700. The cells 11 and the control board 70 are placed in a housing 75 which has two faces 76 and 77 respectively adapted for connection to the apparatus to be powered, for example a video camera, and to a charger keying can be used to prevent erroreous connection. Electrical connections may be affected via metal surfaces present in mating flanges 78 to make connection between the battery pack and apparatus to be powered or a charger or both. The connection include supply connections, a charge connection, and a data connection. In the present case, a two part housing is shown for assembly convenience.

A case with a standard footprint may also be used, since but virtue of the present invention a charger "incompatible" with the cell type may be used. This makes latest battery technology (Metal Hydride, for example) available to existing equipment originally supplied with a Ni—Cad battery pack and standard or bespoke footprint charger.

Since may types of charger may be employed with the pack a case adapted to fit different chargers of many footprints may be used. A pack having a "charging" face or footprint and an "application" face or footprints is also envisaged.

I claim:

1. A battery pack comprising:

at least one electrical energy-providing cell forming a battery;

positive and negative terminals connected to said at least one cell and adapted to receive electrical current from a battery charging current source in providing charging of said at least one cell;

a memory in which predetermined battery parameters definitive of a battery pack characteristic are storable, one of said battery parameters in said memory being a battery pack characteristic indicative of full charge in said at least one cell;

means for sensing at least the onset of said one battery parameter indicative of full charge in said at least one cell;

a selective current shunting circuit operably connected to said positive and negative terminals connected to said at least one cell;

said means for sensing at least the onset of said battery parameter indicative of full charge in said at least one cell including a temperature coefficient resistor in said selective current shunting circuit, said temperature coefficient resistor being connected to said positive and negative terminals and extending across said at least one cell;

said selective current shunting current further including a voltage-controlled switch connected to said temperature coefficient resistor, said voltage-controlled switch being in an open state to render said current shunting circuit inoperable during normal usage of the battery pack, and a first resistor connected in series with said voltage-controlled switch and to said positive and negative terminals such that said first resistor and said voltage-controlled switch extend across said at least one cell in electrically parallel relationship with respect to said temperature coefficient resistor;

said temperature coefficient resistor being responsive to an increase in the temperature of said at least one cell indicative of the onset of full charge in said at least one cell and decreasing the resistance of said temperature coefficient resistor to adapt the battery pack to provide charge current shunting; and said selective current shunting circuit being rendered operable in response to an increased voltage applied to said voltage-controlled switch closing said switch by virtue of the resistance decreasing in said temperature coefficient resistor in response to an increase in the cell temperature to provide charge current shunting of electrical current provided from the battery charging current source to said positive and negative terminals in a direction through said current shunting circuit and bypassing said at least one cell in providing protection against overcharge.

2. A battery pack as set forth in claim 1, wherein said voltage-controlled switch of said selective current shunting circuit is a bipolar transistor having base, collector and emitter electrodes;

the base electrode of said bipolar transistor being connected to said temperature coefficient resistor, the collector electrode being connected to said first resistor, and the emitter electrode being connected to the negative terminal;

said bipolar transistor being rendered conductive in response to an increased voltage applied to the base electrode thereof by virtue of the resistance decreasing in said temperature coefficient resistor in response to an increase in the cell temperature such that electrical current from the battery charging current source is transmitted through said current shunting circuit via said first resistor and said bipolar transistor when conductive so as to bypass said at least one cell.

3. A battery pack comprising:

at least one electrical-energy providing cell forming a battery;

positive and negative terminals connected to said at least one cell and adapted to receive electrical current from a battery charging current source in providing charging of said at least one cell;

a memory in which predetermined battery parameters definitive of a battery pack characteristic are storable, one of said battery parameters in said memory being a battery cell temperature threshold attained when substantially full charge has been restored to said at least one cell;

a temperature detector for sensing the onset of the temperature threshold attained when substantially full charge has been restored to said at least one cell;

a selective current shunting circuit operably connected to said positive and negative terminals connected to said at least one cell;

a micro-controller for monitoring and regulating a battery characteristic as defined by a predetermined battery parameter including the battery cell temperature threshold as a battery pack characteristic indicative of full charge in said at least one cell, said micro-controller being operably connected to said temperature detector and being responsive to said temperature detector detecting a temperature at or exceeding the battery cell temperature threshold indicative of full charge in said at least one cell to adapt the battery pack to provide charge current shunting;

said micro-controller being responsive to the detection of a temperature rise by said temperature detector to a magnitude reaching the battery cell temperature threshold indicative of the onset of full charge in said at least one cell for rendering said current shunting circuit operable to provide charge current shunting of electrical current provided from the battery charging current source to said positive and negative terminals in a direction bypassing said at least one cell;

said selective current shunting circuit including a shunting transistor having a control gate, said shunting transistor being connected across said positive and negative terminals so as to extend across said at least one cell;

said micro-controller being operably connected to the control gate of said shunting transistor; and said shunting transistor being rendered conductive in response to an increased voltage applied to the control gate thereof by said micro-controller in response to an increase in the cell temperature as detected by said temperature detector such that electrical current is transmitted through said shunting transistor when conductive of said selective current shunting circuit so as to bypass said at least one cell in providing protection against overcharge.

4. A battery pack as set forth in claim 1, wherein said memory includes stored predetermined battery parameters corresponding to a predetermined battery model; and said micro-controller being responsive to the sensing of at least one battery parameter and dependent upon the predetermined battery model and the predetermined battery parameters stored in said memory to control the battery pack characteristic in accordance with a desired battery pack characteristic associated with the predetermined battery model.

5. A battery pack comprising:

at least one electrical energy-providing cell forming a battery;

positive and negative terminals connected to said at least one cell and adaptive to receive electrical current from a battery charging current source in providing charging of said at least one cell;

a memory in which predetermined battery parameters definitive of a battery pack characteristic are storable, one of said battery parameters in said memory being a battery pack characteristic indicative of full charge in said at least one cell;

means for sensing at least the onset of said one battery parameter indicative of full charge in said at least one cell; and a selective current shunting circuit operably connected to said positive and negative terminals connected to said at least one cell;

said sensing means being responsive to the detection of the onset of full charge in said at least cell to adapt the battery pack to provide charge current shunting by rendering said current shunting circuit operable to provide charge current shunting of electrical current provided from the battery charging current source to said positive and negative terminals in a direction bypassing said at least one cell in providing protection against overcharge;

said means for sensing at least the onset of said one battery parameter indicative of full charge in said at least one cell including a temperature coefficient resistor in said selective current shunting circuit, said temperature coefficient resistor being connected to said positive and negative terminals and extending across said at least one cell; and said current shunting circuit including a voltage-controlled switch connected to said temperature coefficient resistor, said voltage-controlled switch being in an open state to render said current shunting circuit inoperable during normal usage of the battery pack;

said current shunting circuit being rendered operable in response to an increased voltage applied to said voltage-controlled switch closing said switch by virtue of the resistance decreasing in said temperature coefficient resistor in response to an increase in the cell temperature to provide charge current shunting of electrical current in a direction through said current shunting circuit and bypassing said at least one cell.

* * * * *